United States Patent
Ryu et al.

(10) Patent No.: US 12,360,705 B2
(45) Date of Patent: Jul. 15, 2025

(54) STORAGE DEVICE, OPERATING METHOD OF STORAGE DEVICE, AND OPERATING METHOD OF COMPUTING DEVICE INCLUDING STORAGE DEVICE

(71) Applicant: Samsung Electronics Co., Ltd., Suwon-si (KR)

(72) Inventors: Jimin Ryu, Hwaseong-si (KR); Jongju Kim, Yeongcheon-si (KR); Jeong-Woo Park, Hwaseong-si (KR); Byung-Ki Lee, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/586,687

(22) Filed: Feb. 26, 2024

(65) Prior Publication Data

US 2025/0013388 A1 Jan. 9, 2025

Related U.S. Application Data

(63) Continuation of application No. 17/242,743, filed on Apr. 28, 2021, now abandoned.

(30) Foreign Application Priority Data

Sep. 29, 2020 (KR) .................. 10-2020-0127152
Dec. 2, 2020 (KR) .................. 10-2020-0167080

(51) Int. Cl.
G06F 3/06 (2006.01)

(52) U.S. Cl.
CPC .......... *G06F 3/0659* (2013.01); *G06F 3/0611* (2013.01); *G06F 3/0679* (2013.01)

(58) Field of Classification Search
CPC ..... G06F 3/0659; G06F 3/0611; G06F 3/0679
USPC ........................................ 711/103
See application file for complete search history.

(56) References Cited

U.S. PATENT DOCUMENTS

| | | | |
|---|---|---|---|
| 7,475,207 | B2 | 1/2009 | Bromling et al. |
| 8,301,912 | B2 | 10/2012 | Lin et al. |
| 9,122,401 | B2 | 9/2015 | Zaltsman et al. |
| 9,696,927 | B2 | 7/2017 | Cain, III et al. |
| 10,120,589 | B2 | 11/2018 | Jung |
| 10,607,708 | B2 | 3/2020 | Oh et al. |
| 11,360,708 | B1 | 6/2022 | Farhan et al. |
| 2014/0195480 | A1 | 7/2014 | Talagala et al. |
| 2016/0019143 | A1 | 1/2016 | Yamashita et al. |

(Continued)

FOREIGN PATENT DOCUMENTS

| | | |
|---|---|---|
| KR | 10-2019-0086341 A | 7/2019 |
| KR | 10-2020-0044646 A | 4/2020 |
| KR | 10-2132387 B1 | 7/2020 |

*Primary Examiner* — Kenneth M Lo
*Assistant Examiner* — Han V Doan
(74) *Attorney, Agent, or Firm* — Harness, Dickey & Pierce, P.L.C.

(57) ABSTRACT

Disclosed is a storage device, which includes a nonvolatile memory device, and a controller that controls the nonvolatile memory device. In response to a first command, a barrier command, and a second command being received from an external host device, the controller supports an order guarantee between the first command and the second command. Each of the first command and the second command is selected from two or more different commands. In response to a request from the external host device, the controller circuitry is configured to provide the external host device with a device descriptor associated with the ordering.

20 Claims, 17 Drawing Sheets

(56) References Cited

U.S. PATENT DOCUMENTS

| | | |
|---|---|---|
| 2016/0283157 A1 | 9/2016 | Kanai et al. |
| 2017/0017421 A1 | 1/2017 | Takei et al. |
| 2018/0067866 A1 | 3/2018 | Shanbhogue et al. |
| 2019/0013081 A1 | 1/2019 | Blodgett et al. |
| 2019/0079702 A1 | 3/2019 | Yeon et al. |
| 2019/0220404 A1 | 7/2019 | Hwang |
| 2019/0235785 A1 | 8/2019 | Akers |
| 2019/0286338 A1 | 9/2019 | Noda |
| 2019/0332436 A1 | 10/2019 | Lee |
| 2020/0371702 A1 | 11/2020 | Cariello |

FIG. 7

| | 0 | 1 | 2 | 3 |
|---|---|---|---|---|
| | \multicolumn{4}{c}{COMMAND UPIU} | | | |
| 0 | xx00 0001b | Flags | LUN | Task Tag |
| 4 | IID \| Command Set Type | Reserved | Reserved | Reserved |
| 8 | Total EHS Length(00h) | Reserved | (MSB) Data Segment Length(0000h) | (LSB) |
| 12 | (MSB) | Expected Data Transfer Length | | (LSB) |
| 16 | CDB[0] | CDB[1] | CDB[2] | CDB[3] |
| 20 | CDB[4] | CDB[5] | CDB[6] | CDB[7] |
| 24 | CDB[8] | CDB[9] | CDB[10] | CDB[11] |
| 28 | CDB[12] | CDB[13] | CDB[14] | CDB[15] |
| | \multicolumn{4}{c}{Header E2ECRC (omit if HD = 0)} | | | |

FIG. 8

| Byte \ Bit | 7 | 6 | 5 | 4 | 3 | 2 | 1 | 0 |
|---|---|---|---|---|---|---|---|---|
| 0 | OPERATION CODE(D0h) | | | | | | | |
| 1 | Reserved | | | | | | | |
| 2 | Reserved | | | | | | | |
| 5 | | | | | | | | |
| 6 | Reserved | | | | | | | |
| 9 | | | | | | | | |
| 10 | Reserved | | | | | | | |
| 13 | | | | | | | | |
| 14 | Reserved | | | | | | | |
| 15 | CONTROL = 00h | | | | | | | |

FIG. 10

| | 0 | | 1 | | 2 | | 3 |
|---|---|---|---|---|---|---|---|
| | \\\\ QUERY REQUEST UPIU \\\\ | | | | | | |
| 0 | xx01 0110b | 1 | Flags | 2 | Reserved | 3 | Task Tag |
| 4 | Reserved | 5 | Query Function | 6 | Reserved | 7 | Reserved |
| 8 | Total EHS Length(00h) | 9 | Reserved | 10 | (MSB) Data Segment Length | 11 | (LSB) |
| 12 | | 13 | | 14 | | 15 | |
| | Transaction Specific Fields | | | | | | |
| 16 | | 17 | | 18 | | 19 | |
| | Transaction Specific Fields | | | | | | |
| 20 | | 21 | | 22 | | 23 | |
| | Transaction Specific Fields | | | | | | |
| 24 | | 25 | | 26 | | 27 | |
| | Transaction Specific Fields | | | | | | |
| 28 | | 29 | | 30 | | 31 | |
| | Reserved | | | | | | |
| | Header E2ECRC (omit if HD = 0) | | | | | | |
| k | Data[0] | k+1 | Data[1] | k+2 | Data[2] | k+3 | Data[3] |
| | ... | | ... | | ... | | ... |
| k+Length-4 | Data[Length-4] | k+Length-3 | Data[Length-3] | k+Length-2 | Data[Length-2] | k+Length-1 | Data[Length-1] |
| | Data E2ECRC (omit if DD = 0) | | | | | | |

FIG. 11

| | | | |
|---|---|---|---|
| 12 | 13 | 14 | 15 |
| 01h | DESCRIPTOR IDN | INDEX (MSB) | SELECTOR (LSB) |
| 16 | 17 | 18 | 19 |
| Reserved | Reserved | | LENGTH |
| 20 | 21 | 22 | 23 |
| | Reserved | | |
| 24 | 25 | 26 | 27 |
| | Reserved | | |

Transaction Specific Fields for READ DESCRIPTOR OPCODE

FIG. 12

| | QUERY RESPONSE UPIU | | |
|---|---|---|---|
| 0 xx11 0110b | 1 Flags | 2 Reserved | 3 Task Tag |
| 4 Reserved | 5 Query Function | 6 Query Response | 7 Reserved |
| 8 Total EHS Length(00h) | 9 Device Information | 10 (MSB) Data Segment Length | 11 (LSB) |
| 12 | 13 | 14 | 15 |
| | Transaction Specific Fields | | |
| 16 | 17 | 18 | 19 |
| | Transaction Specific Fields | | |
| 20 | 21 | 22 | 23 |
| | Transaction Specific Fields | | |
| 24 | 25 | 26 | 27 |
| | Transaction Specific Fields | | |
| 28 | 29 | 30 | 31 |
| | Reserved | | |
| | Header E2ECRC (omit if HD = 0) | | |
| k Data[0] | k+1 Data[1] | k+2 Data[2] | k+3 Data[3] |
| ... | ... | ... | ... |
| k+Length-4 Data[Length-4] | k+Length-3 Data[Length-3] | k+Length-2 Data[Length-2] | k+Length-1 Data[Length-1] |
| | Data E2ECRC (omit if DD = 0) | | |

FIG. 13

| Transaction Specific Fields for READ DESCRIPTOR OPCODE | | | |
|---|---|---|---|
| 12 01h | 13 DESCRIPTOR IDN | 14 INDEX (MSB) | 15 SELECTOR |
| 16 Reserved | 17 Reserved | 18 LENGTH (MSB) | 19 LENGTH (LSB) |
| 20 | 21 | 22 Reserved | 23 |
| 24 | 25 | 26 Reserved | 27 |

FIG. 14

| Transaction Specific Fields for WRITE ATTRIBUTE OPCODE | | | |
|---|---|---|---|
| 12<br>04h | 13<br>ATTRIBUTE IDN | 14<br>INDEX | 15<br>SELECTOR |
| 16<br>Reserved | 17<br>Reserved | 18<br>Reserved | 19<br>Reserved |
| 20<br>(MSB)<br>VALUE[31:24] | 21<br>VALUE[23:16] | 22<br>VALUE[15:8] | 23<br>(LSB)<br>VALUE[7:0] |
| 24 | 25 | 26 | 27 |
| Reserved | | | |

FIG. 15

| | | Transaction Specific Fields for WRITE ATTRIBUTE OPCODE | | |
|---|---|---|---|---|
| 12 04h | 13 ATTRIBUTE IDN | 14 INDEX | 15 SELECTOR | |
| 16 Reserved | 17 Reserved | 18 Reserved | 19 Reserved | |
| 20 (MSB) VALUE[31:24] | 21 VALUE[23:16] | 22 VALUE[15:8] | 23 (LSB) VALUE[7:0] | |
| 24 | 25 | 26 | 27 | |
| | | Reserved | | |

STORAGE DEVICE, OPERATING METHOD OF STORAGE DEVICE, AND OPERATING METHOD OF COMPUTING DEVICE INCLUDING STORAGE DEVICE

CROSS-REFERENCE TO RELATED APPLICATIONS

This application is a continuation under 35 U.S.C. § 120 of U.S. application Ser. No. 17/242,743, filed Apr. 28, 2021, which claims priority under 35 U.S.C. § 119 to Korean Patent Application Nos. 10-2020-0127152 filed on Sep. 29, 2020, and 10-2020-0167080 filed on Dec. 2, 2020, in the Korean Intellectual Property Office, the disclosures of each of which are incorporated by reference herein in their entireties.

BACKGROUND

Some example embodiments of inventive concepts described herein relate to an electronic device, and more particularly, relate to a storage device with improved reliability, an operating method of the storage device, and an operating method of a computing device including the storage device.

A storage device may support or may not support an ordering of commands transferred from an external host device, such as from a processor. In a case where the storage device supports an ordering, the storage device may process commands received from the host device based on the order of receiving the commands.

In the case where the ordering is supported, a data state of the storage device that the host device recognizes may coincide with an actual data state of the storage device, and thus, the integrity of the storage device may be improved. However, because the host device does not issue commands dependent on a state of the storage device, a speed at which the storage device processes data may be reduced.

In the case where the ordering is not supported, the storage device may change an execution order of commands based on a state of the storage device, without informing and/or indicating the state of the storage device of the host device. Accordingly, a speed at which the storage device processes data may be improved. However, because a command order directed by the host device is different from a command order in which the storage device may actually process commands, a data state of the storage device that the host device recognizes may be different from an actual data state of the storage device. Accordingly, the integrity of the storage device may be reduced.

SUMMARY

Some example embodiments of inventive concepts provide a storage device with improved integrity, improved reliability, and improved processing speed by selectively guaranteeing the orderness, an operating method of the storage device, and an operating method of a computing device including the storage device.

According to some example embodiments, a storage device includes a nonvolatile memory device, and a controller circuitry configured to control the nonvolatile memory device. In response to a first command, a barrier command, and a second command being received from an external host device by the storage device, the controller circuitry is configured to support an ordering between the first command and the second command, and each of the first command and the second command is selected from two or more different commands. In response to a request from the external host device, the controller circuitry is configured to provide the external host device with a device descriptor associated with the ordering.

According to some example embodiments, an operating method of a storage device includes receiving at least one first command, receiving a barrier command, receiving at least one second command, and supporting an ordering between the at least one first command and the at least one second command in response to the barrier command. Each of the at least one first command and the at least one second command is selected from two or more different commands.

According to some example embodiments, an operating method of a computing device which includes a storage device and a processor accessing the storage device includes first transferring, at the processor, a first query request to the storage device, second transferring, at the storage device to the processor, a response including a device descriptor associated with a barrier command, the second transferring in response to the first query request, third transferring, at the processor to the storage device, a second query request including barrier targets, setting, at the storage device, attributes based on the barrier targets in response to the second query request, fourth transferring, at the processor to the storage device, a first command, fifth transferring, at the processor to the storage device, the barrier command, sixth transferring, at the processor to the storage device, a second command, and supporting an ordering between the first command and the second command based on the barrier command and on the barrier targets set to the attributes.

BRIEF DESCRIPTION OF THE FIGURES

The above and other objects and features of inventive concepts will become apparent by describing in detail some example embodiments thereof with reference to the accompanying drawings.

FIG. 7 illustrates a command UPIU complying with an UFS standard.

FIG. 8 illustrates an example of 0-th to fifteenth command descriptor blocks of a barrier command.

FIG. 10 illustrates an example of a query request UPIU.

FIG. 11 illustrates transaction specific fields corresponding to a first query for reading a device descriptor.

FIG. 12 illustrates an example of a query response UPIU.

FIG. 13 illustrates transaction specific fields of a first query response corresponding to a first query for reading a device descriptor.

FIG. 14 illustrates transaction specific fields of a query request UPIU corresponding to a second query for setting attributes.

FIG. 15 illustrates transaction specific fields of a second query response corresponding to a second query for setting attributes.

DETAILED DESCRIPTION OF SOME EXAMPLE EMBODIMENTS

Below, example embodiments of inventive concepts may be described in detail and clearly to such an extent that one of ordinary skill in the art easily implements inventive concepts.

Figure 1:
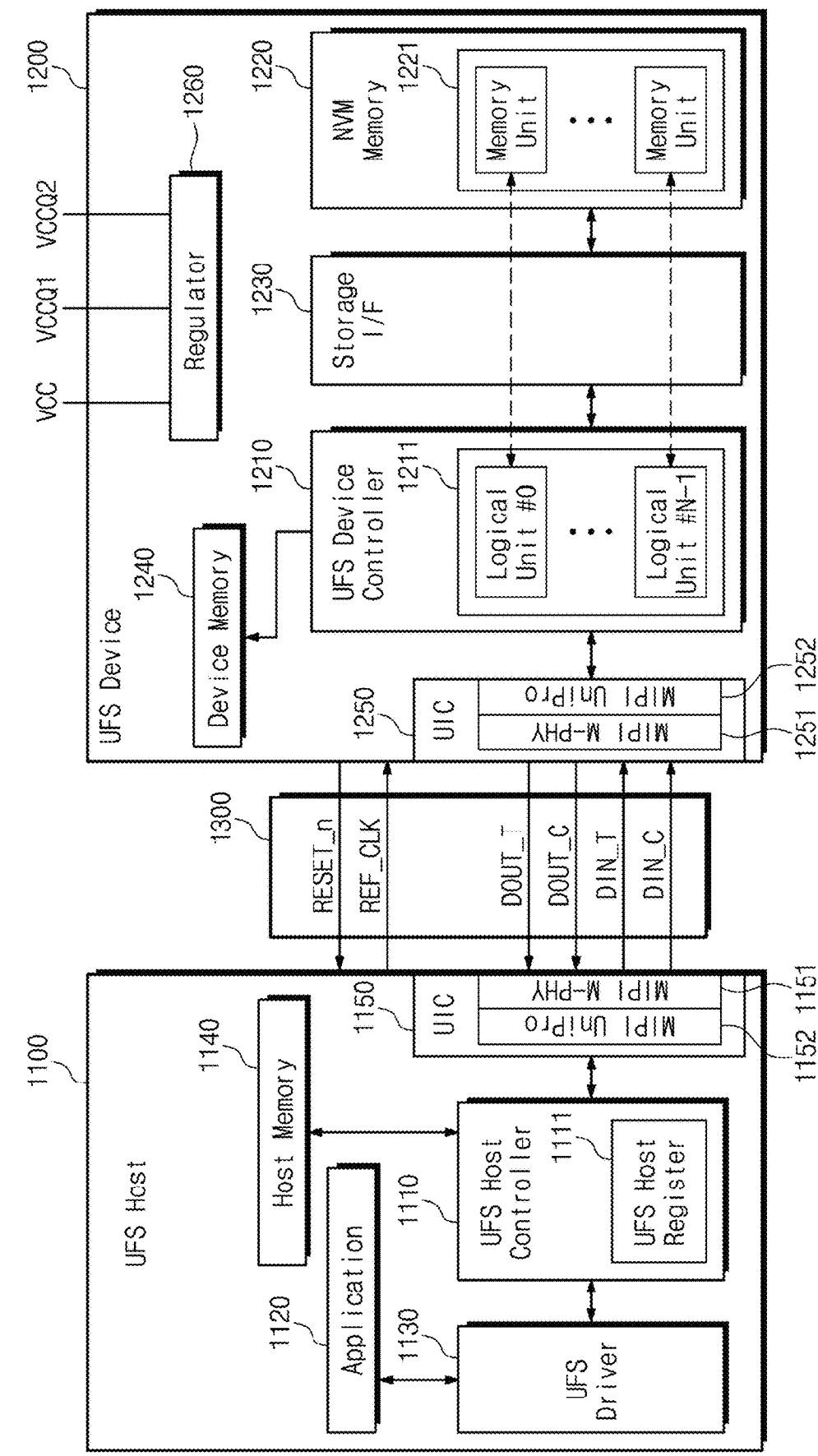
FIG. 1 is a diagram for describing an UFS system according to some example embodiments of inventive concepts.

FIG. 1 is a diagram for describing a universal flash storage (UFS) system 1000 according to example embodiments of inventive concepts. The UFS system 1000 is or includes a system complying with the UFS standard released by the JEDEC (Joint Electron Device Engineering Council) and may include an UFS host 1100, an UFS device 1200, and an UFS interface 1300.

Referring to FIG. 1, the UFS host 1100 may include an UFS host controller 1110, an application 1120 (e.g. a software loaded into a memory), an UFS driver 1130, a host memory 1140, and an UFS interconnect (UIC) layer 1150. The UFS device 1200 may include an UFS device controller 1210, a nonvolatile memory 1220, a storage interface 1230, a device memory 1240, an UIC layer 1250, and a regulator 1260. The nonvolatile memory 1220 may be composed of a plurality of memory blocks or units 1221, and each memory unit 1221 may include a flash memory of a two-dimensional (2D) structure and/or a V-NAND flash memory having a three-dimensional structure, and/or may include a different kind of nonvolatile memory such as at least one of a phase change random access memory (PRAM) or a resistive RAM (RRAM). The UFS device controller 1210 and the nonvolatile memory 1220 may be interconnected through the storage interface 1230. The storage interface 1230 may be implemented to comply with the standard such as Toggle and/or ONFI (Open NAND Flash Interface).

The application 1120 may mean or correspond to a program that wants to or intends to communicate with the UFS device 1200 to use a function of the UFS device 1200. For an input/output associated with the UFS device 1200, the application 1120 may transfer an input-output request IOR to the UFS driver 1130. The input-output request IOR may correspond to, but is not limited to, a request for reading data, a request for writing data, and/or a request for unmapping data.

The UFS driver 1130 may manage the UFS host controller 1110 through an UFS-HCI (Host Controller Interface). The UFS driver 1130 may convert an input-output request generated by the application 1120 to an UFS command defined by the UFS standard and may transfer the UFS command to the UFS host controller 1110. One input-output request may be converted to a plurality of UFS commands. An UFS command may be or correspond to a command defined by the SCSI standard but may be a command dedicated for the UFS standard.

The UFS host controller 1110 may transfer the UFS command converted by the UFS driver 1130 to the UIC layer 1250 of the UFS device 1200 through the UIC layer 1150 and the UFS interface 1300. In this process, a UFS host register 1111 of the UFS host controller 1110 may perform a role of a command queue (CQ)

The UIC layer 1150 of the UFS host 1100 may include an MIPI M-PHY 1151 and an MIPI UniPro 1152, and the UIC layer 1250 of the UFS device 1200 may also include an MIPI M-PHY 1251 and an MIPI UniPro 1252.

The UFS interface 1300 may include a line or a connection for transferring a reference clock REF_CLK, a line or a connection for transferring a hardware reset signal RESET_n for the UFS device 1200, a pair of lines or connections for transferring a differential input signal pair DIN_T and DIN_C, and a pair of lines or connections for transferring a differential output signal pair DOUT_T and DOUT_C.

A frequency value of a reference clock that is provided from the UFS host 1100 to the UFS device 1200 may be, but is not limited to, one of the following frequency values: 19.2 MHz, 26 MHz, 38.4 MHZ, and 52 MHz. The UFS host 1100 may change a frequency value of the reference clock in or during operation, for example, even while data are exchanged between the UFS host 1100 and the UFS device 1200. The UFS device 1200 may generate clocks of various frequencies from the reference clock provided from the UFS host 1100, by using a phase-locked loop (PLL) and/or the like. Alternatively or additionally, the UFS host 1100 may set a value of a data rate between the UFS host 1100 and the UFS device 1200 through a frequency value of the reference clock. For example, a value of the data rate may be determined depending on a frequency value of the reference clock.

The UFS interface 1300 may support multiple lanes, and each lane may be implemented with a differential pair. For example, the UFS interface 1300 may include one or more receive lanes and/or one or more transmit lanes. In FIG. 1, a pair of lines/connections for transferring the differential input signal pair DIN_T and DIN_C may constitute or be included in a receive lane, and a pair of lines/connections for transferring the differential output signal pair DOUT_T and DOUT_C may constitute or be included in a transmit lane. One transmit lane and one receive lane are illustrated in FIG. 1, but the number of transmit and receive lanes may be changed.

The receive lane and the transmit lane may allow data transmission in a serial manner, e.g. may allow serial communication, and a structure in which the receive lane and the transmit lane are separated from each other enables the UFS host 1100 and the UFS device 1200 to communicate with each other in a full-duplex manner. For example, during or overlapping with or while the UFS device 1200 receives data from the UFS host 1100 through the receive lane, the UFS device 1200 may transmit data to the UFS host 1100 through the transmit lane. Also, control data from the UFS host 1100 to the UFS device 1200, such as a command, and user data that the UFS host 1100 intends to write in the nonvolatile memory 1220 of the UFS device 1200 or intends to read from the nonvolatile memory 1220 thereof may be transferred through the same lane. As such, in addition to one receive lane and one transmit lane, a separate lane for data transmission may be further provided between the UFS host 1100 and the UFS device 1200.

The UFS device controller 1210 of the UFS device 1200 may overall control an operation of the UFS device 1200. The UFS device controller 1210 may manage the nonvolatile memory 1220 through a logical unit (LU) 1211, e.g. a logical data storage unit. The number of LUs 1211 may be, but is not limited to, "8". The UFS device controller 1210 may include a flash translation layer (FTL), and may translate a logical data address transferred from the UFS host 1100, for example, a logical block address (LBA) into a physical data address, for example, a physical block address (PBA) by using address mapping information of the FTL. In the UFS system 1000, a logical block for storing user data may have a size of a given range. For example, a minimum size of a logical block may be set to 4 Kbyte.

When a command from the UFS host 1100 is input to the UFS device 1200 through the UIC layer 1250, the UFS device controller 1210 may perform an operation corresponding to the input command; when the operation is completed, the UFS device controller 1210 may transfer a complete response to the UFS host 1100.

For example, when the UFS host 1100 intends to write user data in the UFS device 1200, the UFS host 1100 may instruct the UFS device 1200 and transfer a data write command to the UFS device 1200. When a response indicating ready-to-transfer is received from the UFS device 1200, the UFS host 1100 may transfer user data to the UFS device 1200. The UFS device controller 1210 may buffer or temporarily store the received user data in the device memory 1240 and may store the user data temporarily stored in the device memory 1240 at a selected location of the nonvolatile memory 1220, based on address mapping information of the FTL.

When the UFS host 1100 intends to read user data stored in the UFS device 1200, the UFS host 1100 may instruct the UFS device 1200 and transfer a data read command to the UFS device 1200. The UFS device controller 1210 that receives a command may read user data from the nonvolatile memory 1220 based on the data read command and may buffer or temporarily store the read user data in the device memory 1240. In this read process, the UFS device controller 1210 may detect or detect and correct an error of the read user data, for example by using an embedded error correction code (ECC) engine (not illustrated). In detail, the ECC engine may generate parity bits of write data to be written in the nonvolatile memory 1220, and the parity bits thus generated may be stored in the nonvolatile memory 1220 together with the write data. In reading data from the nonvolatile memory 1220, the ECC engine may correct an error of the read data by using parity bits read from the nonvolatile memory 1220 together with the read data and may output error-corrected read data.

The UFS device controller 1210 may transfer the user data temporarily stored in the device memory 1240 to the UFS host 1100. The UFS device controller 1210 may further include an encryption engine such as an advanced encryption standard (AES) engine (not illustrated). The AES engine may perform at least one of an encryption operation and a decryption operation on data input to the UFS device controller by using a symmetric-key algorithm.

The UFS host 1100 may store commands to be transferred to the UFS device 1200 in the UFS host register 1111, which is capable of functioning as a command queue, depending on an order, e.g. an order of operations such as a queue, and may transmit the commands to the UFS device 1200 depending on the order, e.g. the order of operations. In some example embodiments, even though a previously transmitted command has yet to be processed by the UFS device 1200, for example, even before a notification has been received indicating that the previously transmitted command has been completely processed by the UFS device 1200, the UFS host 1100 may transmit a next command queuing in the command queue to the UFS device 1200, and thus, the UFS device 1200 may also receive the next command from the UFS host 1100 even while processing the previously transmitted command. A number, e.g. the maximum number of commands capable of being stored in the command queue, that is, a queue depth may be, for example, 32; however, example embodiments are not limited thereto. The command queue may implemented by various data structures, such as by a type of a circular queue indicating a start and an end of commands enqueued therein through a head pointer and a tail pointer, respectively.

Each of the plurality of memory units 1221 may include a memory cell array (not illustrated) and a control circuit (not illustrated) controlling an operation of the memory cell array. The memory cell array may include a two-dimensional memory cell array and/or a three-dimensional memory cell array. The memory cell array may include a plurality of memory cells, and each memory cell may be a single level cell (SLC) storing 1-bit information and/or may be a cell storing information of two or more bits, such as a multi-level cell (MLC), and/or a triple level cell (TLC), and/or a quadruple level cell (QLC). The three-dimensional memory cell array may include a vertical NAND string vertically oriented such that at least one memory cell is disposed above another memory cell.

As a power supply voltage, such as VCC, VCCQ1, VCCQ2, etc. may be input to the UFS device 1200. The power supply voltage VCC that is a main power supply voltage of the UFS device 1200 may have a value of between 2.4 to 3.6 V. The power supply voltage VCCQ1 corresponding to a power supply voltage for supplying a voltage of a low range may be for or mainly for the UFS device controller 1210 and may have a value of between 1.14 to 1.26 V. The power supply voltage VCCQ2 that is smaller than the power supply voltage VCC but is a power supply voltage for supplying a voltage of a high range compared to the power supply voltage VCCQ1 may have a value of between 1.7 to 1.95 V may be mainly for an input/output interface such as the MIPI M-PHY 1251. The power supply voltages VCC, VCCQ1, and VCCQ2 may be supplied to components of the UFS device 1200 through the regulator 1260. The regulator 1260 may be implemented with or by a set of unit regulators each connected with a different power supply voltage of the above-described power supply voltages.

In some example embodiments, an example of the UFS system 1000 including the UFS host 1100 and the UFS device 1200 is illustrated in FIG. 1. However, example embodiments are not limited to the UFS and may be implemented with a system and/or a computing device including a host device and a storage device, which operate based on any other standard.

Figure 2:
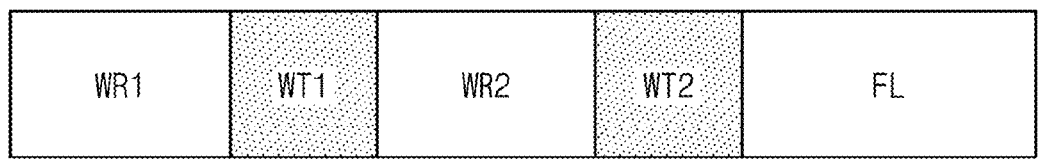
FIG. 2 illustrates a first example in which an UFS system performs a write operation.

FIG. 2 illustrates a first example in which the UFS system 1000 performs a write operation. Referring to FIGS. 1 and 2, the UFS system 1000 may perform a write operation by calling a "fSync" function. The UFS host 1100 may prepare write data during a first write interval WR1.

Afterwards, during a first wait-on-transfer interval WT1, the UFS host 1100 may transfer a write command and the write data to the UFS device 1200. The UFS system 1000 may wait until the write data are transferred from the UFS host 1100 to the UFS device 1200. In some example embodiments, the first wait-on-transfer interval WT1 may be or correspond to a direct memory access (DMA) transfer time.

During a second write interval WR2, the UFS host 1100 may prepare a node corresponding to write data, for example, to metadata. Afterwards, during a second wait-on-transfer interval WT2, the UFS host 1100 may transfer the write command and the node (or metadata) to the UFS device 1200. During the second wait-on-transfer interval WT2, the UFS system 1000 may wait until the node (or metadata) is transferred from the UFS host 1100 to the UFS device 1200. In some example embodiments, the second wait-on-transfer interval WT2 may be a DMA transfer time.

Afterwards, during a wait-on-flush interval FL, the UFS host 1100 may transfer a flush command to the UFS device 1200. The UFS system 1000 may wait until the write data and the node (or metadata) are flushed to the nonvolatile memory 1220.

According to the "fSync" function, the write data and the node (or metadata) may be sequentially transferred to the UFS device 1200 and may then be written in the nonvolatile memory 1220. Accordingly, a list of data of the UFS device 1200 managed by the UFS host 1100 may be the same as a list of data actually stored in the UFS device 1200. However, an "fSync" command may make a parallel and/or simultaneous access to the UFS device 1200 impossible, thereby reducing the performance of the UFS system 1000.

In some example embodiments, when the UFS system 1000 is described as waiting, this may correspond to the UFS host 1100 not accessing the UFS device 1200, and may not correspond to the UFS device 1200 not performing any operation. While the UFS system 1000 waits, the UFS host 1100 may access any other device, except for the UFS device 1200 and may perform other operations and/or calculations.

Figure 3:
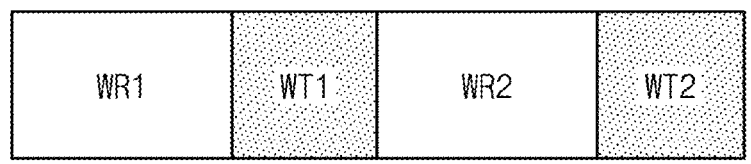
FIG. 3 illustrates a second example in which an UFS system performs a write operation.

FIG. 3 illustrates a second example in which the UFS system 1000 performs a write operation. Referring to FIGS. 1 and 3, the UFS system 1000 may perform a write operation based on a "noBarrier" option. The UFS host 1100 may prepare write data during a first write interval WR1.

Afterwards, during a first wait-on-transfer interval WT1, the UFS host 1100 may transfer a write command to the UFS device 1200 and transfer the write data to the UFS device 1200. The UFS system 1000 may wait until the write data are transferred from the UFS host 1100 to the UFS device 1200. In some example embodiments, the first wait-on-transfer interval WT1 may be or correspond to a DMA transfer time.

During a second write interval WR2, the UFS host 1100 may prepare a node corresponding to write data, for example, metadata. Afterwards, during a second wait-on-transfer interval WT2, the UFS host 1100 may transfer the write command and the node (or metadata) to the UFS device 1200. During the second wait-on-transfer interval WT2, the UFS system 1000 may wait until the node (or metadata) is transferred from the UFS host 1100 to the UFS device 1200. In example embodiments, the second wait-on-transfer interval WT2 may be or correspond to a DMA transfer time.

According to the "noBarrier" option, the UFS host 1100 may not transfer the flush command to the UFS device 1200. Because the UFS system 1000 need not wait during the wait-on-flush interval FL (refer to FIG. 2), the performance of the UFS system 1000 may be improved.

However, according to the "noBarrier" option, due to scheduling of the UFS device 1200, an order, e.g. an order of operations, of the write command of the write data and the write command of the node (or metadata) may be changed. For example, the UFS device 1200 may try to write the write data after writing the node (or metadata) in the nonvolatile memory 1220.

After the node (or metadata) is written in the nonvolatile memory 1220 and before the write data are written therein, a sudden power-off (SPO) event may occur. Due to the SPO, the UFS device 1200 may lose the write data, e.g. may not have written the write data in the nonvolatile memory 1220. In some example embodiments, because the node (or metadata) is already written in the nonvolatile memory 1220, the write data may be identified by the UFS host 1100 as if written. However, the write data are not actually written in the UFS device 1200. For example, according to the "noBarrier" option, the integrity of data of the UFS system 1000 may be reduced, thereby causing the reduction of reliability of the UFS system 1000.

Figure 4:
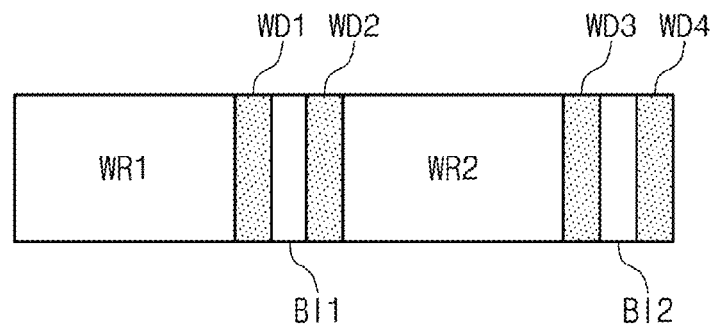
FIG. 4 illustrates a third example in which an UFS system performs a write operation.

FIG. 4 illustrates a third example in which the UFS system 1000 performs a write operation. Referring to FIGS. 1 and 4, the UFS system 1000 may call a "fBarrier" function to perform a write operation. The UFS host 1100 may prepare write data during a first write interval WR1.

Afterwards, during a first wait-on-dispatch interval WD1, the UFS host 1100 may transfer a write command to the UFS device 1200. The UFS system 1000 may wait until the write command is dispatched from the UFS host 1100 to the UFS device 1200.

Afterwards, during a first barrier interval BI1, the UFS host 1100 may prepare a barrier command. After preparing the barrier command, during a second wait-on-dispatch interval WD2, the UFS host 1100 may transfer the barrier command to the UFS device 1200. The UFS system 1000 may wait until the barrier command is dispatched from the UFS host 1100 to the UFS device 1200.

Afterwards, the UFS host 1100 may prepare a node (or metadata) during a second write interval WR2. During a third wait-on-dispatch interval WD3, the UFS host 1100 may transfer the write command to the UFS device 1200. The UFS system 1000 may wait until the write command is dispatched from the UFS host 1100 to the UFS device 1200.

After the third wait-on-dispatch interval WD3, during a second barrier interval BI2, the UFS host 1100 may prepare the barrier command. After preparing the barrier command, during a fourth wait-on-dispatch interval WD4, the UFS host 1100 may transfer the barrier command to the UFS device 1200. The UFS system 1000 may wait until the barrier command is dispatched from the UFS host 1100 to the UFS device 1200.

According to the "fBarrier" function, the UFS system 1000 may not wait until write data and a node (or metadata) are transmitted from the UFS host 1100 to the UFS device 1200. The UFS device 1200 may maintain an order, e.g. an order of operations, of commands before the barrier command and commands after the barrier command and may schedule the commands. Accordingly, both the reliability and the performance of the UFS system 1000 may be improved by reducing a wait time, with the integrity of data of the UFS system 1000 maintained.

Figure 5:
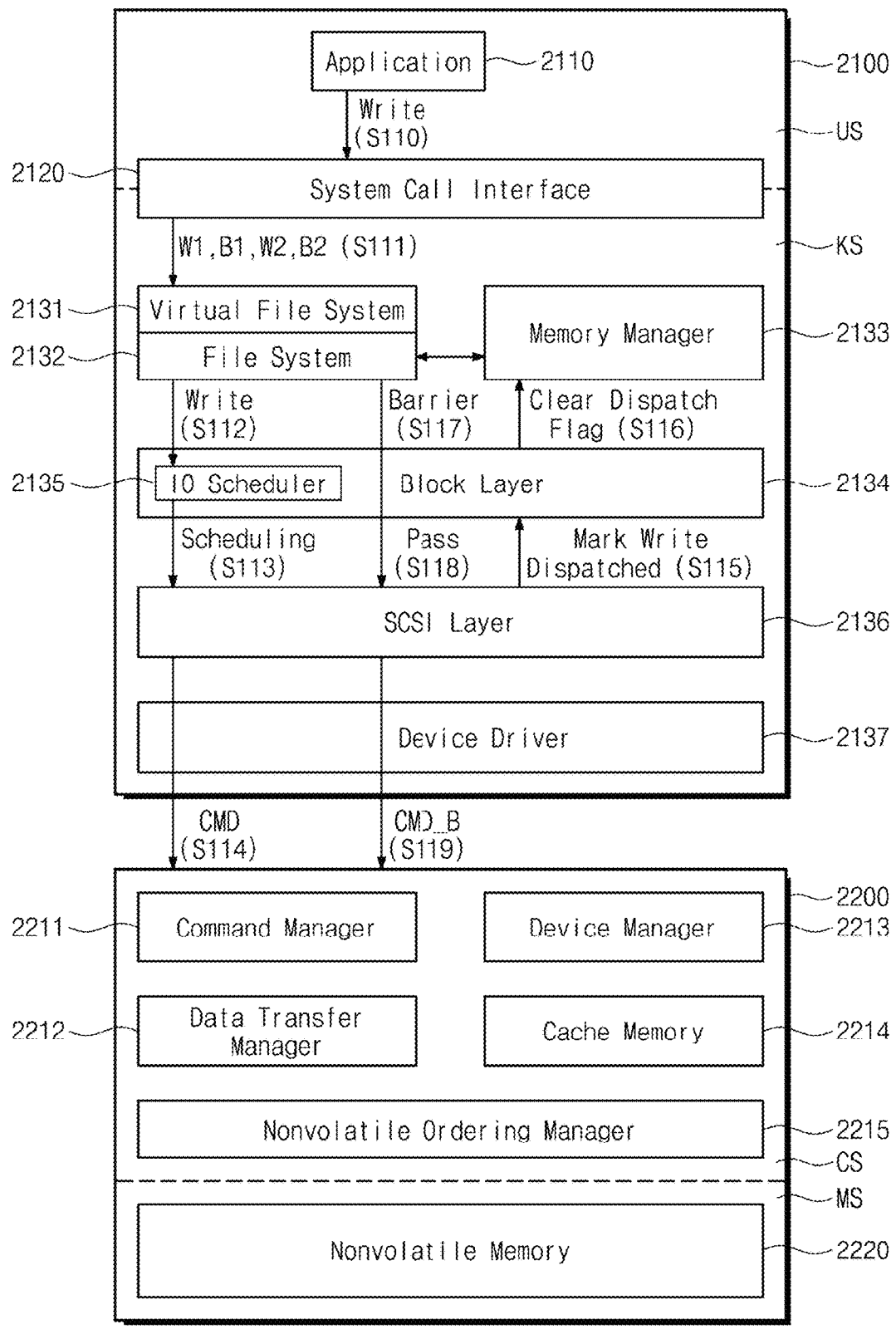
FIG. 5 illustrates an example in which a software architecture of an UFS system performs a write operation.

FIG. 5 illustrates an example in which a software architecture 2000 of the UFS system 1000 performs a write operation. Referring to FIG. 5, the software architecture 2000 may include a host layer 2100 and a device layer 2200. The host layer 2100 may indicate a software layer of the UFS host 1100, and the device layer 2200 may indicate a software layer of the UFS device 1200.

Referring to FIGS. 1 and 5, the host layer 2100 may be divided into a user space US and a kernel space KS and may include an application 2110, a system call interface 2120, a virtual file system 2131, a file system 2132, a memory manager 2133, a block layer 2134, an SCSI layer 2136, and a device driver 2137.

The application 2110 may be executed on or in the user space US. The system call interface 2120 may support communication between the user space US and the kernel space KS. The virtual file system 2131 may convert a system call so as to be appropriate for a kind of the file system 2132. The file system 2132 may manage control information associated with files or directories. The memory manager 2133 may manage a memory, for example, the host memory 1140.

The block layer 2134 may perform an input operation and/or an output operation, depending on a request of the file system 2132. The block layer 2134 may include an input/output scheduler 2135 that schedules orders of inputs and outputs. The SCSI layer 2136 may convert an input request or an output request transferred from the block layer 2134 based on a format of the SCSI. The device driver 2137 may convert the request converted by the SCSI layer 2136 to a format appropriate for the device layer 2200 and may then transfer the format-converted request to the device layer 2200. For example, the device driver 2137 may correspond to the UIC layer 1250.

The device layer 2200 may be divided into a control space CS and a memory space MS and may include a command manager 2211, a data transfer manager 2212, a device manager 2213, a cache memory 2214, a nonvolatile ordering manager 2215, and a nonvolatile memory 2220.

The command manager 2211 may analyze a command received from the host layer 2100, and may transfer the analyzed command to the nonvolatile ordering manager 2215. The data transfer manager 2212 may manage a data transfer to and/or from the host layer 2100. The device manager 2213 may identify a state of the device layer 2200, and depending on the identified state, the device manager 2213 may perform a control and may control settings. The cache memory 2214 may be used to temporarily store data and may correspond, for example, to the device memory 1240.

The nonvolatile ordering manager 2215 may receive analyzed commands from the command manager 2211, and may manage and schedule execution orders, or orders of execution, of the analyzed commands. The nonvolatile ordering manager 2215 may execute a command depending on an order and may access the nonvolatile memory 2220.

A process in which a write operation requested by the application 2110 is processed will be described with reference to FIGS. 1, 4, and 5. Within the software architecture 2000, commands transferred between components are cited by using the same reference signs. However, it may be understood that a format of a command may be converted by each component.

In operation S110, the application 2110 may transfer a write request to the system call interface 2120. In operation S111, the system call interface 2120 may sequentially transfer a first write command W1, a first barrier command B1, a second write command W2, and a second barrier command B2 to the virtual file system 2131, based on the "fBarrier" function.

First, a process in which write data are processed will be described based on the first write command W1. In operation S112, the virtual file system 2131 may transfer the first write command W1 to the file system 2132. The file system 2132 may call the memory manager 2133 for the purpose of writing the write data in the block layer 2134. After writing the write data in the block layer 2134, the memory manager 2133 may set a dispatch flag corresponding to the write data. Operation S112 may correspond to the first write interval WR1.

In operation S113, the input/output scheduler 2135 of the block layer 2134 may schedule the first write command W1 with other commands. When the first write command W1 is to be executed, the block layer 2134 may request the SCSI layer 2136 to dispatch the first write command W1. In operation S114, the SCSI layer 2136 may dispatch the first write command W1 to the device layer 2200 through the device driver 2137.

After dispatching the first write command W1, the SCSI layer 2136 may notify the block layer 2134 that the first write command W1 is dispatched. The block layer 2134 may request the memory manager 2133 to clear the dispatch flag set by the memory manager 2133. Operation S113, operation S114, operation S115, and operation S116 may correspond to the first wait-on-dispatch interval WD1.

In operation S117, the file system 2132 may transfer the first barrier command B1 to the block layer 2134. The file system 2132 may request the memory manager 2133 to set a dispatch flag corresponding to the first barrier command B1. Operation S117 may correspond to one or both of the barrier interval BI1 or BI2.

In operation S118, the block layer 2134 may pass the first barrier command B1 to the SCSI layer 2136 without passing through the input/output scheduler 2135. In operation S119, the SCSI layer 2136 may transfer the first barrier command B1 to the device layer 2200 through the device driver 2137. Because the scheduling of the first barrier command B1 is omitted, the first barrier command B1 may be dispatched in succession after or immediately after the first write command W1 is dispatched.

Afterwards, as described with reference to operation S115 and operation S116, the memory manager 2133 may be requested to clear the dispatch flag. Operation S118, operation S119, and operation S115 and operation S116 for clearing the dispatch flag of the first barrier command B1 may correspond to the second wait-on-dispatch interval WD2.

Afterwards, the second write command W2 and the second barrier command B2 may be transferred to the device layer 2200 in orders the same as the orders described above.

As described above, a barrier command may be usefully used as a means for or to improving the integrity of data in the UFS system 1000. The UFS system 1000 according to some example embodiments of inventive concepts may further improve the reliability of the UFS system 1000 and the integrity of data by applying the barrier command to extended commands including the writing of write data and the writing of a node (or metadata).

Figure 6:
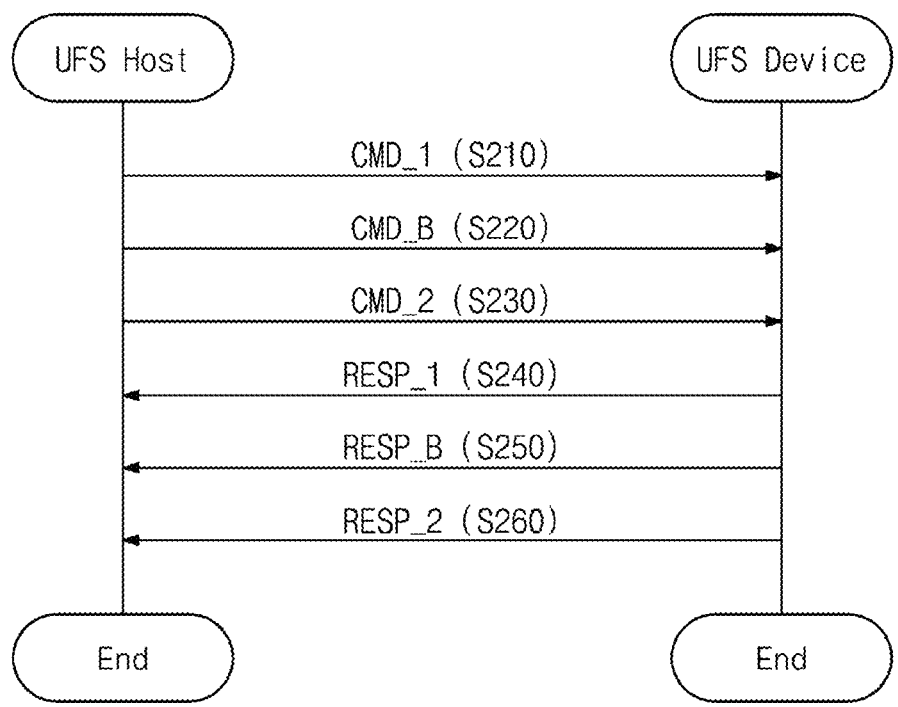
FIG. 6 is a flowchart illustrating an operating method of an UFS system according to some example embodiments of inventive concepts.

FIG. 6 is a flowchart illustrating an operating method of the UFS system 1000 according to some example embodiments of inventive concepts. Referring to FIGS. 1 and 6, in operation S210, the UFS host 1100 may transfer a first command CMD_1 to the UFS device 1200.

In operation S220, the UFS host 1100 may transfer a barrier command CMD_B to the UFS device 1200. In operation S230, the UFS host 1100 may transfer a second command CMD_2 to the UFS device 1200. In response to the first command CMD_1, the barrier command CMD_B, and the second command CMD_2 being sequentially received, the UFS device 1200 may support an ordering, e.g. an order guarantee, between the first command CMD_1, the barrier command CMD_B, and the second command CMD_2.

In operation S240, the UFS device 1200 may perform the first command CMD_1 and may transfer, to the UFS host 1100, a first response RESP_1 including a result of performing the first command CMD_1. In some example embodiments, when the first command CMD_1 is a write command or a read command, prior to the first response RESP_1, an RTT (Ready To Transfer) UPIU (UFS Protocol Information Unit) and a Data In UPIU or a Data Out UPIU may be exchanged between the UFS host 1100 and the UFS device 1200.

After the first command CMD_1 is completely performed in operation S240, in operation S250, the UFS device 1200 may process the barrier command CMD_B. In some example embodiments, the barrier command CMD_B may not cause the Data In UPIU or the Data Out UPIU. For example, the barrier command CMD_B may not cause a data exchange between the UFS host 1100 and the UFS device 1200. In response to the barrier command CMD_B, the UFS device 1200 may transfer, to the UFS host 1100, a barrier response RESP_B including a result of processing the barrier command CMD_B.

In operation S260, the UFS device 1200 may perform the second command CMD_2 and may transfer, to the UFS host 1100, a second response RESP_2 including a result of performing the second command CMD_2. In some example embodiments, when the second command CMD_2 is a write command or a read command, before the second response RESP_2 and after the first response RESP_1, the RTT UPIU and the Data In UPIU or the Data Out UPIU may be exchanged between the UFS host 1100 and the UFS device 1200.

FIG. 7 illustrates a command UPIU complying with a UFS standard. Referring to FIGS. 6 and 7, the command UPIU may include or be used to transport the first command CMD_1, the barrier command CMD_B, and the second command CMD_2.

The command UPIU may include a transaction type as a 0-th field (0). The transaction type specified in the command UPIU may be a string such as a binary string such as "xx00 0001b". The command UPIU may include or consist of flags as a first field (1). The flags may include or consist of read flags Flags.R indicating Read, write flags Flags.W indicating Write, attribute flags Flags.ATTR indicating task attributes of a command, and priority flags Flags.CP indicating a command priority.

The command UPIU may include a logical unit number LUN as a second field (2). The command UPIU may include or consist of a task tag Task Tag as a third field (3). The command UPIU may include an initiator ID IID and a command set type as a fourth field (4). Fifth to seventh fields (5) to (7) of the command UPIU may be reserved. An eighth field (8) of the command UPIU may include or consist of a total extra header segment (EHS) length. The total EHS length may not be used when set to "00h".

A ninth field (9) of the command UPIU may be reserved, e.g. reserved for future use. Tenth and eleventh fields (10) and (11) of the command UPIU may include or consist of a data segment length. The tenth field (10) may be a most significant bit (MSB) of the data segment length, and the eleventh field (11) may be a least significant bit (LSB) thereof. The data segment length may be set to a string such as a hexadecimal string such as "0000h" and may not be used.

Twelfth to fifteenth fields (12) to (15) of the command UPIU may include or consist of an expected data transfer length. The twelfth field (12) may be an MSB of the expected data transfer length, and the fifteenth field (15) may be an LSB thereof. The command UPIU may include or consist of 0-th to fifteenth command descriptor blocks CDB[0] to CDB[15] as sixteenth to thirty-first fields (16) to (31). A header E2ECRC (End-to-End Cyclic Redundancy Code) of the command UPIU may be omitted when a most significant bit HD of the transaction type of the 0-th field (0) is "0".

FIG. 8 illustrates an example of the 0-th to fifteenth command descriptor blocks CDB[0] to CDB[15] of the barrier command CMD_B. In FIG. 8, numbers 0 to 15 expressed by "Byte" may correspond to the 0-th to fifteenth command descriptor blocks CDB[0] to CDB[15], respectively. In FIG. 8, numbers 0 to 7 expressed by "Bit" may correspond to bits included in each of the 0-th to fifteenth command descriptor blocks CDB[0] to CDB[15].

Referring to FIGS. 7 and 8, the 0-th command descriptor block CDB[0] of the barrier command CMD_B may have a value of D0h as an operation code. The first to fourteenth command descriptor blocks CDB[1] to CDB[14] of the barrier command CMD_B may be reserved. The fifteenth command descriptor block CDB[15] of the barrier command CMD_B may include a control byte and may not be used when set to "00h".

Figure 9:
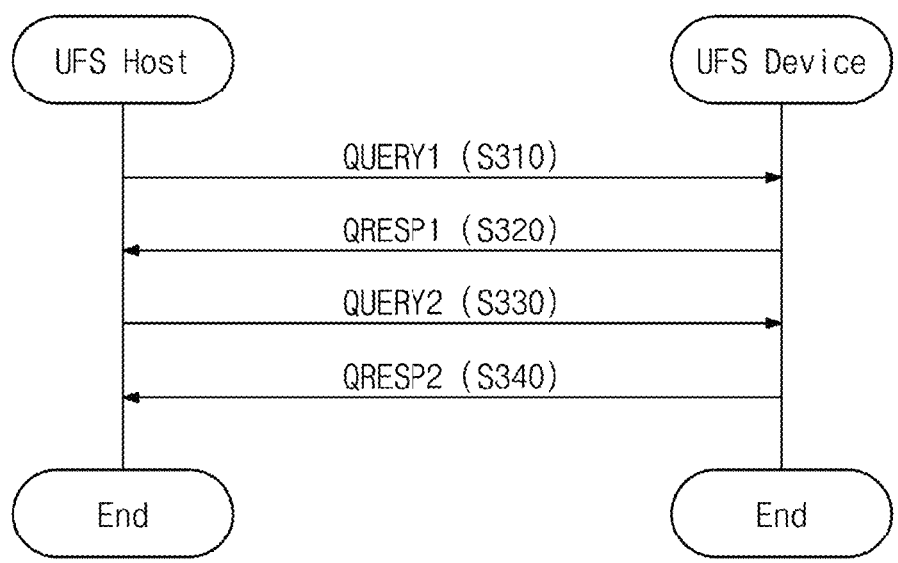
FIG. 9 illustrates an example in which an UFS system confirms and sets pieces of information associated with a barrier command.

FIG. 9 illustrates an example, e.g. an example of a protocol, in which the UFS system 1000 confirms and sets pieces of information associated with the barrier command CMD_B. Referring to FIGS. 1 and 9, in operation S310, the UFS host 1100 may transfer a first query QUERY1 to the UFS device 1200. The first query QUERY1 may request information about the barrier command CMD_B.

In operation S320, in response to the first query QUERY1, the UFS device 1200 may transfer a first query response QRESP1 to the UFS host 1100. The first query response QRESP1 may include information about the barrier command CMD_B, for example, a device descriptor.

In operation S330, the UFS host 1100 may transfer a second query QUERY2 to the UFS device 1200. The second query QUERY2 may include settings associated with the barrier command CMD_B, for example, settings such as attributes.

In operation S340, the UFS device 1200 may set attributes associated with the barrier command CMD_B, based on the settings transferred from the UFS host 1100. Afterwards, the UFS device 1200 may transfer a second query response QRESP2 to the UFS host 1100. In some example embodiments, the procedures of FIG. 9 may be performed while the UFS host 1100 and the UFS device 1200 perform provisioning.

FIG. 10 illustrates an example of a query request UPIU. Referring to FIGS. 1, 9, and 10, the query request UPIU may be used to transport the first query QUERY1 and the second query QUERY2. The query request UPIU may include a transaction type as a 0-th field (0). The transaction type specified in the query request UPIU may be a string such as a binary string such as "xx01 0110b".

The query request UPIU may include flags as a first field (1). Each flag may have a value of true or false, a value of "0" or "1", or a value of on or off. The flags may be used to enable or disable specific functions, modes, or states.

A second field (2) of the query request UPIU may be reserved, e.g. reserved for future use. A third field (3) of the query request UPIU may include or consist of a task tag Task Tag. A fourth field (4) of the query request UPIU may be reserved, e.g. reserved for future use. A fifth field (5) of the query request UPIU may include or consist of a query function. For example, since the first query QUERY1 may be for reading a device descriptor associated with the barrier command CMD_B, the query function may have a value of a hexadecimal string such as "01h" corresponding to a standard read request. Since the second query QUERY2 may be for writing attributes associated with the barrier command CMD_B, the query function may have a value of a hexadecimal string such as "81h" corresponding to a standard write request.

Sixth and seventh fields (6) and (7) of the query request UPIU may be reserved, e.g. reserved for future use. An eighth field (8) of the query request UPIU may include or consist of a total EHS length. The total EHS length may not be used when set to a hexadecimal string such as "00h". A ninth field (9) of the query request UPIU may be reserved. The query request UPIU may include or consist of a data segment length as tenth and eleventh fields (10) and (11). The tenth field (10) may be a most significant bit (MSB) of the data segment length, and the eleventh field (11) may be a least significant bit (LSB) thereof.

Twelfth to twenty-seventh fields (12) to (27) of the query request UPIU may include or consist of transaction specific fields. Twenty-eighth to thirty-first fields (28) to (31) of the query request UPIU may be reserved. A header E2ECRC (End-to-End Cyclic Redundancy Code) of the query request UPIU may be omitted when a most significant bit HD of the transaction type of the 0-th field (0) is "0".

In the query request UPIU, k-th to (k+data segment length-1)-th fields may include 0-th to (length-1)-th data Data [0] to Data [length-1]. A data E2ECRC (End-to-End Cyclic Redundancy Code) of the query request UPIU may be omitted when a next bit DD of the most significant bit HD of the transaction type of the 0-th field (0) is "0". In some example embodiments, the first query QUERY1 may not include data fields. The second query QUERY2 may include or consist of data fields.

FIG. 11 illustrates transaction specific fields corresponding to the first query QUERY1 for reading a device descriptor. Referring to FIGS. 1, 9, 10, and 11, the twelfth field (12) of the query request UPIU may include an operation code and may be set to a hexadecimal string such as "01h" to read a device descriptor from the first query QUERY1.

The thirteenth to twenty-seventh fields (13) to (27) of the query request UPIU may include or consist of operation code specific fields and may be variable depending on an operation code. In the first query QUERY1, the thirteenth field (13) of the query request UPIU may include or consist of a descriptor identifier and may indicate a device descriptor, a unit descriptor, or a string descriptor. In the first query QUERY1, the descriptor may be set to a hexadecimal string such as "00h".

In the first query QUERY1, the fourteenth field (14) of the query request UPIU may include or consist of an index and may distinguish descriptors in more detail. In the first query QUERY1, the index may be set to a hexadecimal string such as "00h". In the first query QUERY1, the fifteenth field (15) of the query request UPIU may include or consist of a selector and may distinguish descriptors in more detail. In the first query QUERY1, the selector may be set to a hexadecimal string such as "01h".

In the first query QUERY1, the sixteenth and seventeenth fields (16) and (17) of the query request UPIU may be reserved, e.g. reserved for future use. In the first query QUERY1, the eighteenth and nineteenth fields (18) and (19) of the query request UPIU may include or consist of a length. The length may indicate a length of a descriptor to be read. The eighteenth field (18) of the query request UPIU may be an MSB, and the nineteenth field (19) of the query request UPIU may be an LSB. In the first query QUERY1, the twentieth to twenty-seventh fields (20) and (27) of the query request UPIU may be reserved, e.g. reserved for future use.

FIG. 12 illustrates an example of a query response UPIU. The query response UPIU may be used to transport the first query response QRESP1 and the second query response QRESP2. The query response UPIU may include a transaction type as a 0-th field (0). The transaction type specified in the query response UPIU may be a string such as a binary string such as "xx11 0110b".

A first field (1) of the query response UPIU may include or consist of flags the same as the flags specified in the first field (1) of the query request UPIU. A second field (2) of the query response UPIU may be reserved, e.g. reserved for future use. A third field (3) of the query response UPIU may include or consist of a task tag the same as the task tag specified in the third field (3) of the query request UPIU.

A fourth field (4) of the query response UPIU may be reserved, e.g. reserved for future use. A fifth field (5) of the query response UPIU may include or consist of a query function the same as the query function specified in the fifth field (5) of the query request UPIU.

A sixth field (6) of the query response UPIU may include or consist of a query response. The query response may include information of an execution result of the query request UPIU, such as success (e.g., hexadecimal 00h), unreadable (e.g., hexadecimal F6h), unwritable (e.g., hexadecimal F7h), already written (e.g., hexadecimal F8h), an invalid length (e.g., hexadecimal F9h), an invalid value (e.g., hexadecimal FAh), an invalid selector (e.g., hexadecimal FBh), an invalid index (e.g., hexadecimal FCh), an invalid identifier (e.g., hexadecimal FDh), an invalid operation code (e.g., hexadecimal FEh), and a normal fail (e.g., hexadecimal FFh).

A seventh field (7) of the query response UPIU may be reserved. An eighth field (8) of the query response UPIU may include or consist of a total EHS length. The total EHS length may not be used when set to hexadecimal "00h". A ninth field (9) of the query response UPIU may include device information. One bit (e.g., the 0-th bit) of the device information may be used for an exception event alert, and the remaining bits thereof may be reserved.

The query response UPIU may include a data segment length as tenth and eleventh fields (10) and (11). The tenth field (10) may be a most significant bit (MSB) of the data segment length, and the eleventh field (11) may be a least significant bit (LSB) thereof.

Twelfth to twenty-seventh fields (12) to (27) of the query response UPIU may include or consist of transaction specific fields. Twenty-eighth to thirty-first fields (28) to (31) of the query response UPIU may be reserved. A header E2ECRC (End-to-End Cyclic Redundancy Code) of the query response UPIU may be omitted when a most significant bit HD of the transaction type of the 0-th field (0) is "0".

In the query response UPIU, k-th to (k+data segment length-1)-th fields may include 0-th to (length-1)-th data Data [0] to Data [length-1]. A data E2ECRC (End-to-End Cyclic Redundancy Code) of the query response UPIU may be omitted when a next bit DD of the most significant bit HD of the transaction type of the 0-th field (0) is "0". In some example embodiments, the first query response QRESP1 may not include data fields. The second query response QRESP2 may include or consist of data fields.

FIG. 13 illustrates transaction specific fields of the first query response QRESP1 corresponding to the first query QUERY1 for reading a device descriptor. Referring to FIGS. 1, 9, 12, and 13, the twelfth field (12) of the query response UPIU may include or consist of an operation code and may be set to hexadecimal "01h" the same as the operation code of the first query QUERY1.

The thirteenth to twenty-seventh fields (13) to (27) of the query response UPIU may include or consist of operation code specific fields and may be variable depending on an operation code. In the first query response QRESP1, the thirteenth field (13) of the query response UPIU may include or consist of a descriptor identifier and may indicate a device descriptor, a unit descriptor, or a string descriptor. In the first query response QRESP1, the descriptor identifier may be set to a string such as a hexadecimal string such as "00h".

In the first query response QRESP1, the fourteenth field (14) of the query response UPIU may include or consist of an index and may distinguish descriptors in more detail. In the first query response QRESP1, the index may be set to hexadecimal "00h". In the first query response QRESP1, the fifteenth field (15) of the query response UPIU may include a selector and may distinguish descriptors in more detail. In the first query response QRESP1, the selector may be set to hexadecimal "01h".

In the first query response QRESP1, the sixteenth and seventeenth fields (16) and (17) of the query response UPIU may be reserved, e.g. reserved for future use. In the first query response QRESP1, the eighteenth and nineteenth fields (18) and (19) of the query response UPIU may include a length. The length may indicate or consist of a length of a descriptor to be read. The eighteenth field (18) may be an MSB, and the nineteenth field (19) may be an LSB. In the first query response QRESP1, the twentieth to twenty-seventh fields (20) to (27) of the query response UPIU may be reserved, e.g. reserved for future use.

In some example embodiments, operation code specific fields of the first query response QRESP1 may be the same as the operation code specific fields of the first query QUERY1.

Through the first query QUERY1 and the first query response QRESP1, the UFS host 1100 may obtain a descriptor associated with the barrier command CMD_B, for example, a device descriptor from the UFS device 1200.

The device descriptors obtained through the first query QUERY1 and the first query response QRESP1 may include or consist of "bLength" field. The "bLength" field may include an offset of hexadecimal "00h", a size of "1", and a manufacturer default value (MDV) of hexadecimal "63h"; in the "bLength" field, a user configuration may not be permitted. The "bLength" field may indicate or consist of a size of a descriptor.

The device descriptors obtained through the first query QUERY1 and the first query response QRESP1 may include "dExtentedUFSFeaturesSupport" field. The "dExtentedUFSFeaturesSupport" field may include an offset of hexadecimal "4Fh", a size of hexadecimal "4", and a manufacturer default value (MDV) of "device specific"; in the "dExtentedUFSFeaturesSupport" field, a user configuration may not be permitted. The "dExtentedUFSFeaturesSupport" field may indicate a size of a descriptor.

The "dExtentedUFSFeaturesSupport" field may include or consist of extended UFS specific support information. The "dExtentedUFSFeaturesSupport" field may indicate features that are supported by a device. A part of the values of the "dExtentedUFSFeaturesSupport" field may be the same as that defined by bits [7:0] of a "bUFSFeaturesSupport" field and may indicate the same function as that defined by the bits [7:0] of the "bUFSFeaturesSupport" field. Because the "bUFSFesturesSupport" field is obsoleted, referring to the "dExtentedUFSFeaturesSupport" field for the purpose of finding a device feature support may be recommended. When a specific bit of the "dExtentedUFSFeaturesSupport" field is set to "1", a feature corresponding to the specific bit may be supported.

In the "dExtentedUFSFeaturesSupport" field, bit [0] may indicate a field firmware update (FFU), bit [1] may indicate a production state awareness (PSA), bit [2] may indicate a device life span, bit [3] may indicate a refresh operation, bit [4] may indicate a too high temperature TOO_HIGH_TEMPERATURE, and bit [5] may indicate a too low temperature TOO_LOW_TEMPERATURE.

In the "dExtentedUFSFeaturesSupport" field, bit [6] may indicate an extended temperature, bit [7] may be reserved for a host-aware performance booster, bit [8] may indicate a write booster WriteBooster, bit [9] may indicate performance throttling, bits [13:10] may be reserved for Samsung extended features, bit may indicate a barrier, and bits [31:15] may be reserved.

A "wBarrierVersion" field may include an offset of "5Fh", a size of "2", and a manufacturer default value (MDV) of "device specific"; in the "wBarrierVersion" field, a user configuration may not be permitted. The "wBarrier Version" field may indicate a barrier specification version.

In the "wBarrierVersion" field, bits [15:8] may indicate a major version (e.g., A of version A.BC) of a binary-coded decimal (BCD) format, bits [7:4] may indicate a minor version (e.g., B of version A.BC) of the BCD format, and bits [3:0] may indicate a version suffix (e.g., C of version A.BC) of the BCD format. For example, version 1.00 may be expressed in the form of hexadecimal "0100h".

A "bBarrierScope" field may include an offset of hexadecimal "61h", a size of "1", and a manufacturer default value (MDV) of "device specific"; in the "bBarrierScope" field, a user configuration may not be permitted. The "bBarrierScope" field may indicate a barrier scope. The "bBarrierScope" field may indicate whether the barrier command CMD_B transferred to a specific logical unit guarantees an order of commands all over a device or within the corresponding logical unit.

In some example embodiments where a value of the "bBarrierScope" field is "00h" may indicate a device scope DEVICE_SCOPE. The barrier command CMD_B may ensure an order of commands all over a device without distinction between logical units. In some example embodiments where a value of the "bBarrierScope" field is "01h" may indicate a logical unit scope LU_SCOPE. The barrier command CMD_B may ensure an order of commands within the corresponding logical unit.

A "bMaxBarrierLevel" field may include or consist of an offset of hexadecimal "62h", a size of "1", and a manufacturer default value (MDV) of "device specific"; in the "bMaxBarrierLevel" field, a user configuration may not be permitted. The "bMaxBarrierLevel" field may indicate a maximum a large, e.g. a maximum barrier level. The "bMaxBarrierLevel" field may specify a maximum barrier level that a device is capable of supporting.

The "bMaxBarrierLevel" field having a value of hexadecimal "00h" may indicate barrier level 0. The "bMaxBarrierLevel" field having a value of hexadecimal "01h" may indicate barrier level 1. The "bMaxBarrierLevel" field having a value of hexadecimal "02h" may indicate barrier level 2. The "bMaxBarrierLevel" field having a value of hexadecimal "03h" may indicate barrier level 3.

In some example embodiments, depending on a barrier level, the UFS device 1200 may differentially support an order guarantee with respect to various different commands. Table 1 below shows an example in which an order guarantee is differentially supported with respect to various different commands.

TABLE 1

| | Command | | | | |
|---|---|---|---|---|---|
| | WRITE | | UNMAP | | |
| Barrier level | FUA = 0 | FUA = 1 | Discard | Erase | Format unit |
| Level 0 | ○ | x | x | x | x |
| Level 1 | ○ | x | ○ | x | x |
| Level 2 | ○ | ○ | ○ | ○ | x |
| Level 3 | ○ | ○ | ○ | ○ | ○ |

In Table 1 above, "FUA" indicates a force unit access. When "FUA" is "0", write data may be written in a cache (e.g., the device memory 1240) or a medium (e.g., the nonvolatile memory 1220). When "FUA" is "1", write data may be written in the medium.

For example, when "FUA" is "0", a write command may be processed in a writeback manner in which a write complete is determined after the write data are written in the device memory 1240. When "FUA" is "1", a write command may be processed in a writethrough manner in which a write complete is determined after the write data are written in the nonvolatile memory 1220.

The unmap command may be processed as erase or discard. For example, the UFS device 1200 may further manage a configuration descriptor. In provisioning, the UFS host 1100 may set the configuration descriptor of the UFS device 1200. The configuration descriptor may include or consist of a unit descriptor.

When a provisioning type (bProvisioningType) parameter of the unit descriptor is set to hexadecimal "03h", the UFS device 1200 may process the unmap command as erase. When the provisioning type (bProvisioningType) parameter of the unit descriptor is set to hexadecimal "02h", the UFS device 1200 may process the unmap command as discard.

The "unmap" may release allocations of one or more logical addresses. The "unmap" may not require that unmapped data are physically fully erased immediately from the nonvolatile memory 1220. When a read operation associated with unmapped data is performed (e.g., using a physical address) before the unmapped data are physically fully erased from the nonvolatile memory 1220, the UFS device 1200 may output "0". When a read operation associated with discarded data is performed (e.g., using a physical address) before the discarded data are physically fully discarded from the nonvolatile memory 1220, the UFS device 1200 may output the discarded data.

FIG. 14 illustrates transaction specific fields of a query request UPIU corresponding to the second query QUERY2 for setting attributes. Referring to FIGS. 1, 9, 10, and 14, the twelfth field (12) of the query request UPIU may include an operation code and may be set to "04h" to set attributes at the second query QUERY2.

The thirteenth to twenty-seventh fields (13) to (27) of the query request UPIU may include or consist of operation code specific fields and may be variable depending on an operation code. In the second query QUERY2, the thirteenth field (13) may include or consist of an attribute identifier for identifying attributes targeted for setting.

In the second query QUERY2, the fourteenth field (14) of the query request UPIU may include or consist of an index and may identify attributes in detail. In the second query QUERY2, the fifteenth field (15) of the query request UPIU may include or consist of a selector and may distinguish descriptors in more detail. In some example embodiments, attributes associated with the barrier command CMD_B may be identified by an identifier of "3Ah", an index of "00h", and a selector of "00h".

In the second query QUERY2, the sixteenth to nineteenth fields (16) to (19) of the query request UPIU may be reserved, e.g. reserved for future use. In the second query QUERY2, the twentieth to twenty-third fields (20) to (23) of the query request UPIU may include value [31:0]. Value [31:0] may include or consist of values set to attributes.

A twentieth field (20) of the query request UPIU may include or consist of value [31:24] and may be an MSB. A twenty-first field (21) of the query request UPIU may include or consist of value [23:16]. A twenty-second field (22) of the query request UPIU may include or consist of value [15:8]. A twenty-third field (23) of the query request UPIU may include or consist of value [7:0] and may be an LSB. Twenty-fourth to thirty-seventh fields (24) to (27) of the query request UPIU may be reserved, e.g. reserved for future use.

In the second query QUERY2, value [31:0] of the query request UPIU may include or consist of a "bBarrierLevel" field. The "bBarrierLevel" field may include or consist of an identifier of "3Ah", an access property of read/persistent, a size of "1", and a type of "D". A write property of persistent may indicate that a plurality of write operations are possible. The type of "D" may indicate that the corresponding property is a device level.

The "bBarrierLevel" field may set a barrier level. "00h" may set barrier level 0. "01h" may set barrier level 1. "02h" may set barrier level 2. "03h" may set barrier level 3. The "bBarrierLevel" field may set a barrier level to be equal to or lower than a large/maximum level defined by a "bMaxBarrierLevel" field of a device descriptor.

In the above example embodiments, the description is given as kinds or scopes of commands to which the barrier command CMD_B is applied are defined by the "bBarrierScope" field, the "bMaxBarrierLevel" field, and the "bBarrierLevel" field. However, example embodiments are not limited thereto.

In some example embodiments, the "bBarrierScope" field of the device descriptor may be replaced with a "bSupportedBarrierScope" field. A "bSupportedBarrierScope" field may include or consist of an offset of hexadecimal "5Fh", a size of "1", and a manufacturer default value (MDV) of "device specific"; in the "bSupportedBarrierScope" field, a user configuration may not be permitted or may be permitted. The "bSupportedBarrierScope" field may indicate a supportable barrier scope. The "bSupportedBarrierScope" field may indicate whether the barrier command CMD_B transferred to a specific logical unit guarantees an order of commands all over a device or within the corresponding logical unit.

In some example embodiments where a value of the "bSupportedBarrierScope" field is "00h" may indicate a device scope DEVICE_SCOPE. The barrier command CMD_B may ensure an order of commands all over a device without distinction between logical units. In some example embodiments where a value of the "bSupportedBarrierScope" field is "01h" may indicate a logical unit scope LU_SCOPE. The barrier command CMD_B may ensure an order of commands within the corresponding logical unit.

A "bSupportedBarrierTargets" field may include an offset of "60h", a size of "1", and a manufacturer default value (MDV) of "device specific"; in the "bSupportedBarrierTargets" field, a user configuration may not be permitted. The "bSupportedBarrierTargets" field may specify target commands in which the barrier command CMD_B is supported.

A 0-th bit of the "bSupportedBarrierTargets" field may specify whether to support the barrier command CMD_B associated with a writeback command (e.g., a write command where "FUA" is "0"). A first bit of the "bSupportedBarrierTargets" field may specify whether to support the barrier command CMD_B associated with a writethrough command (e.g., a write command where "FUA" is "1").

A second bit of the "bSupportedBarrierTargets" field may specify whether to support the barrier command CMD_B associated with a discard command (e.g., an unmap command when the provisioning type (bProvisioningType) parameter is set to hexadecimal "02h"). A third bit of the "bSupportedBarrierTargets" field may specify whether to support the barrier command CMD_B associated with an erase command (e.g., an unmap command when the provisioning type (bProvisioningType) parameter is set to hexadecimal "03h").

A fourth bit of the "bSupportedBarrierTargets" field may specify whether to support the barrier command CMD_B associated with a format unit command.

In some example embodiments, when a user configuration of the "bSupportedBarrierScope" field is permitted, attributes may include a "bBarrierScope" field. The second query QUERY2 may further include a "bBarrierScope" field. The "bBarrierScope" field may include an identifier of hexadecimal "3Ah", an access property of read/persistent, and a size of "1".

When the "bBarrierScope" field of the attributes is set to hexadecimal "00h", a barrier scope may be set to a device. When the "bBarrierScope" field of the attributes is set to hexadecimal "01h", the barrier scope may be set to a logical unit.

The "bBarrierScope" field of the attributes may be replaced with a "bBarrierTargets" field. The "bBarrierTargets" field may include or consist of an identifier of hexadecimal "3Bh", an access property of read/persistent, a size of "1", and a type of "D".

When a 0-th bit of the "bBarrierLevel" field of the attributes is set to a first value, a writeback command may be set to a target of the barrier command CMD_B. When the 0-th bit of the "bBarrierLevel" field of the attributes is set to a 0-th value, the writeback command may be excluded from a target of the barrier command CMD_B.

When a first bit of the "bBarrierLevel" field of the attributes is set to the first value, a writethrough command may be set to a target of the barrier command CMD_B. When the first bit of the "bBarrierLevel" field of the attributes is set to the 0-th value, the writethrough command may be excluded from a target of the barrier command CMD_B.

When a second bit of the "bBarrierLevel" field of the attributes is set to the first value, a discard command may be set to a target of the barrier command CMD_B. When the second bit of the "bBarrierLevel" field of the attributes is set to the 0-th value, the discard command may be excluded from a target of the barrier command CMD_B.

When a third bit of the "bBarrierLevel" field of the attributes is set to the first value, an erase command may be set to a target of the barrier command CMD_B. When the third bit of the "bBarrierLevel" field of the attributes is set to the 0-th value, the erase command may be excluded from a target of the barrier command CMD_B.

When a fourth bit of the "bBarrierLevel" field of the attributes is set to the first value, a format unit command may be set to a target of the barrier command CMD_B. When the fourth bit of the "bBarrierLevel" field of the attributes is set to the 0-th value, the format unit command may be excluded from a target of the barrier command CMD_B.

Fields associated with the barrier level may set a scope of commands to which the barrier command CMD_B is applied, for each level. In contrast, fields associated with the barrier targets may individually specify commands to which the barrier command CMD_B is applied. The fields associated with the barrier targets may be regarded as setting, in a bitmap manner, targets to which the barrier command CMD_B is applied.

FIG. 15 illustrates transaction specific fields of the second query response QRESP2 corresponding to the second query QUERY2 for setting attributes. Referring to FIGS. 1, 9, 12, and 15, the twelfth field (12) of the query response UPIU may include or consist of an operation code and may be set to hexadecimal "04h" the same as the operation code of the second query QUERY2.

The thirteenth to twenty-seventh fields (13) to (27) of the query response UPIU may include or consist of operation code specific fields and may be variable depending on an operation code. In the second query response QRESP2, the thirteenth field (13) of the query response UPIU may include or consist of an attribute identifier. In the second query response QRESP2, the attribute identifier may be set to hexadecimal "3Ah" to be the same as that of the second query QUERY2.

In the second query response QRESP2, the fourteenth field (14) of the query response UPIU may include or consist of an index and may distinguish attributes in more detail. In the second query response QRESP2, the index may be set to hexadecimal "00h". In the second query response QRESP2, the fifteenth field (15) of the query response UPIU may include or consist of a selector and may distinguish attributes in more detail. In the second query response QRESP2, the selector may be set to hexadecimal "00h".

In the second query response QRESP2, the sixteenth to nineteenth fields (16) to (19) of the query response UPIU may be reserved. In the second query response QRESP2, the twentieth to twenty-third fields (20) to (23) of the query request UPIU may include value [31:0]. Value [31:0] may include values set to the attributes and may be the same as value [31:0] of the query request UPIU of the second query QUERY2. Twenty-fourth to thirty-seventh fields (24) to (27) of the query request UPIU may be reserved.

Figure 16:
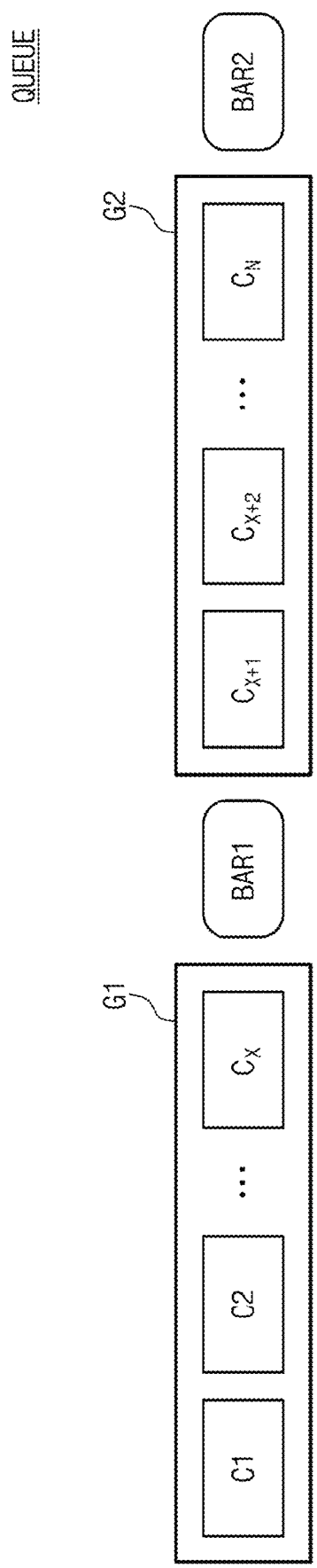
FIG. 16 illustrates a first example in which an order guarantee of commands is supported at a command queue of an UFS device.

FIG. 16 illustrates a first example in which an ordering, e.g. an order guarantee and/or order of execution guarantee, of commands is supported at a command queue QUEUE of the UFS device 1200. Referring to FIGS. 1 and 16, the UFS host 1100 may sequentially transfer first to X-th commands C1 to $C_X$ of a first group G1 to the UFS device 1200 and may then generate a first barrier BAR1 through the barrier command CMD_B. Afterwards, the UFS host 1100 may sequentially transfer (X+1)-th to N-th commands $C_{X+1}$ to $C_N$ of a second group G2 to the UFS device 1200 and may then generate a second barrier BAR2 through the barrier command CMD_B.

In some example embodiments, the first to N-th commands C1 to $C_N$ may be commands that the UFS device 1200 recognizes as having the same priority and the same type, for example, may be commands having "simple" as a task attribute of an attribute flag of a flag.

The UFS device 1200 may process all the first to X-th commands C1 to $C_X$ of the first group G1 and may then process the (X+1)-th to N-th command $C_{X+1}$ to $C_N$ of the second group G2. An order guarantee between the first to X-th commands C1 to $C_X$ may not be supported within the first group G1. Furthermore, an order guarantee between the (X+1)-th to N-th command $C_{X+1}$ to $C_N$ may not be supported within the second group G2.

When the UFS host 1100 requires or intends for an additional order guarantee in addition to the order guarantee illustrated in FIG. 16, the UFS host 1100 may transfer a flush command to the UFS device 1200 such that a flush operation is performed or may transfer an additional barrier command CMD_B to the UFS device 1200 to form an additional barrier.

Figure 17:
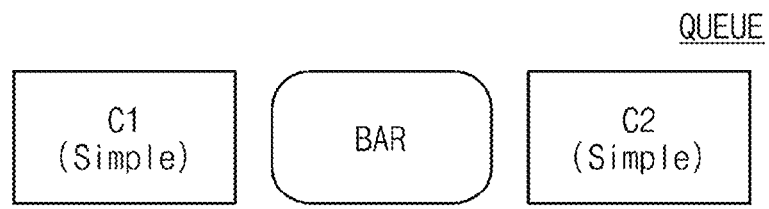
FIG. 17 illustrates a second example in which an order guarantee of commands is supported at a command queue of an UFS device.

The barrier command CMD_B may be processed based on a task attribute of "simple". For example, even in some example embodiments where a task attribute of an attribute flag of a flag of the barrier command CMD_B is a head-of-queue or a priority attribute of a flag is set to a high priority, the UFS device 1200 may process the barrier command CMD_B as if the task attribute of the attribute flag of the flag of the barrier command CMD_B is "simple" or the priority attribute of the flag has no priority, FIG. 17 illustrates a second example in which an order guarantee of commands is supported at a command queue QUEUE of the UFS device 1200. Referring to FIGS. 1 and 17, the UFS host 1100 may sequentially transfer a first command C1, the barrier command CMD_B, and a second command C2 to the UFS device 1200. A barrier BAR may be generated between the first command C1 and the second command C2 by the barrier command CMD_B.

The first command C1 may have a simple attribute (e.g., a task attribute of an attribute flag of a flag is simple), and the second command C2 may have a simple attribute. Accordingly, the UFS device 1200 may ensure an execution order of the first command C1 and the second command C2 based on the barrier BAR. For example, the UFS device 1200 may execute the first command C1 and may then execute the second command C2.

In some example embodiments, the UFS device 1200 may process the first command C1, may process the barrier command CMD_B, and may then process the second command C2. The processing of the barrier command CMD_B may include discarding the barrier BAR generated at the queue QUEUE by the barrier command CMD_B.

Figure 18:
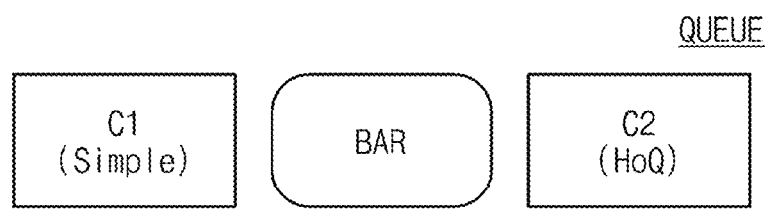
FIG. 18 illustrates a third example in which an order guarantee of commands is supported at a command queue of an UFS device.

FIG. 18 illustrates a third example in which an order guarantee of commands is supported at the command queue QUEUE of the UFS device 1200. Referring to FIGS. 1 and 18, the UFS host 1100 may sequentially transfer a first command C1, the barrier command CMD_B, and a second command C2 to the UFS device 1200. A barrier BAR may be generated between the first command C1 and the second command C2 by the barrier command CMD_B.

The first command C1 may have a simple attribute (e.g., a task attribute of an attribute flag of a flag is simple). The second command C2 may have a head-of-queue (HoQ) attribute (e.g., a task attribute of an attribute flag of a flag is a head-of-queue (HoQ)). Because the second command C2 has the HoQ attribute, to process the first command C1 or the barrier command CMD_B before the second command C2 is not permitted.

For example, the UFS device 1200 may first perform the second command C2 and may then execute the first command C1 and the barrier command CMD_B. In some example embodiments, the processing of the barrier command CMD_B may include discarding the barrier BAR generated at the queue QUEUE by the barrier command CMD_B.

In some example embodiments, the UFS device 1200 may process the second command C2, may process the first command C1, and may then process the barrier command CMD_B. The processing of the barrier command CMD_B may include discarding the barrier BAR generated at the queue QUEUE by the barrier command CMD_B.

Figure 19:
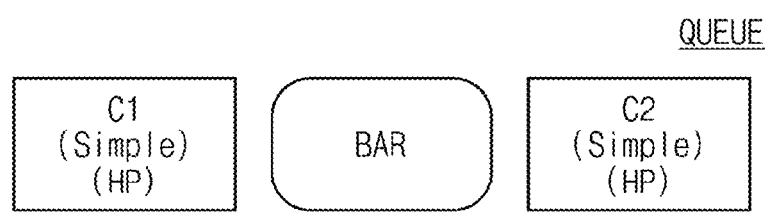
FIG. 19 illustrates a fourth example in which an order guarantee of commands is supported at a command queue of an UFS device.

FIG. 19 illustrates a fourth example in which an order guarantee of commands is supported at the command queue QUEUE of the UFS device 1200. Referring to FIGS. 1 and 19, the UFS host 1100 may sequentially transfer a first command C1, the barrier command CMD_B, and a second command C2 to the UFS device 1200. A barrier BAR may be generated between the first command C1 and the second command C2 by the barrier command CMD_B.

The first command C1 may have a simple attribute (e.g., a task attribute of an attribute flag of a flag is simple) and may have a high priority HP (e.g., a priority at which a priority flag of a flag is high). The second command C2 may have a simple attribute and may have a high priority HP. Because the second command C2 has the high priority, to process the first command C1 before the second command C2 is not permitted.

For example, the UFS device 1200 may first process the first command C1, may process the second command C2, and may then process the barrier command CMD_B. In example embodiments, the processing of the barrier command CMD_B may include discarding the barrier BAR generated at the queue QUEUE by the barrier command CMD_B.

Figure 20:
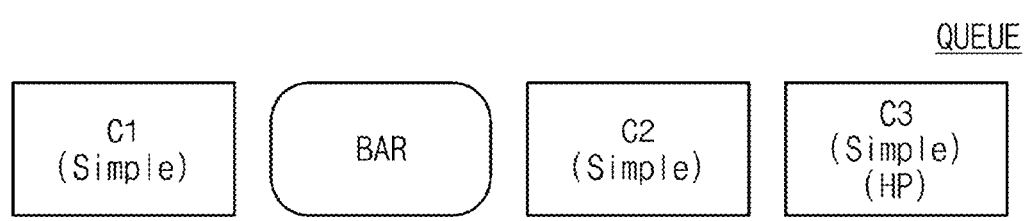
FIG. 20 illustrates a fifth example in which an order guarantee of commands is supported at a command queue of an UFS device.

FIG. 20 illustrates a fifth example in which an order guarantee of commands is supported at the command queue QUEUE of the UFS device 1200. Referring to FIGS. 1 and 20, the UFS host 1100 may sequentially transfer a first command C1, the barrier command CMD_B, a second command C2, and a third command C3 to the UFS device 1200. A barrier BAR may be generated between the first command C1 and the second command C2 by the barrier command CMD_B.

The first command C1 may have a simple attribute (e.g., a task attribute of an attribute flag of a flag is simple). The second command C2 may have a simple attribute. The third command C3 may have a simple attribute and may have a high priority HP (e.g., a priority at which a priority flag of a flag is high). Because the third command C3 has the high priority, to process the first command C1, the barrier command CMD_B, and the second command C2 before the third command C3 is not permitted.

For example, the UFS device 1200 may first process the third command C3, may process the first command C1, may process the barrier command CMD_B, and may then process the second command C2. In some example embodiments, the processing of the barrier command CMD_B may include discarding the barrier BAR generated at the queue QUEUE by the barrier command CMD_B.

Figure 21:
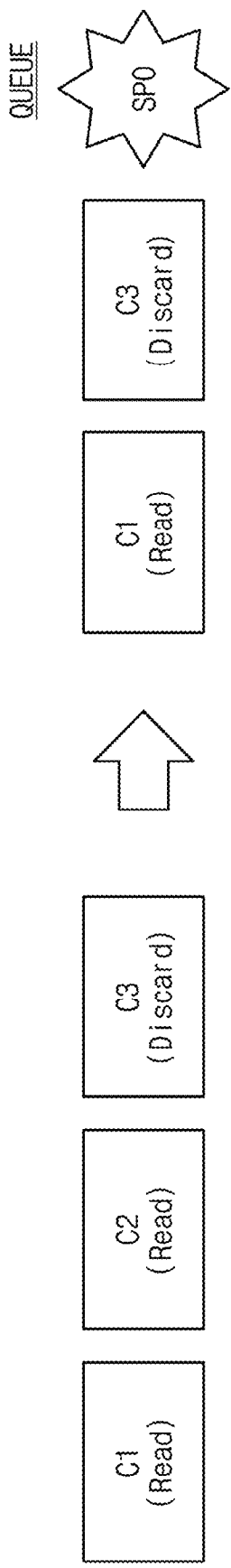
FIG. 21 illustrates an example in which data are lost by scheduling of commands at a queue of an UFS device.

FIG. 21 illustrates an example in which data are lost by scheduling of commands at a queue QUEUE of the UFS device 1200. Referring to FIGS. 1 and 21, the UFS device 1200 may sequentially receive a first command C1, a second command C2, and a third command C3 from the UFS host 1100. The first command C1 may be or include a command for reading data, the second command C2 may be or include a command for writing the read data, and the third command C3 may be or include a command for discarding the read data.

The UFS device 1200 may schedule commands such that the third command C3 is performed prior to the second command C2. The UFS device 1200 may perform the first command C1 to read data from the nonvolatile memory 1220 and may perform the third command C3 to discard the read data. Under the above condition, in a case where the SPO occurs, data are absent from an original location where a read operation is performed and a target location where a write operation is to be performed. That is, data may be lost.

Figure 22:
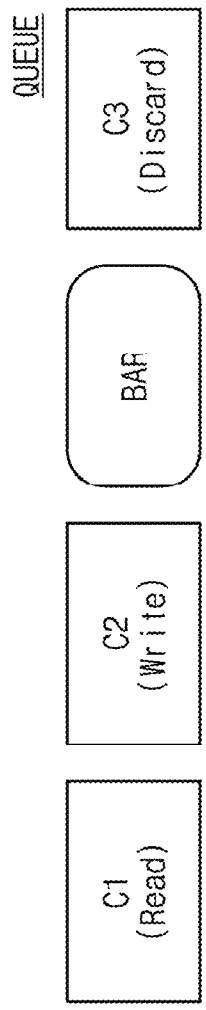
FIG. 22 illustrates an example in which a data loss is reduced or prevented by a barrier at a queue of an UFS device.

FIG. 22 illustrates an example in which a data loss is reduced or prevented by a barrier at the queue QUEUE of the UFS device 1200. Referring to FIGS. 1 and 22, the UFS device 1200 may sequentially receive a first command C1, a second command C2, the barrier command CMD_B, and a third command C3 from the UFS host 1100. A barrier BAR may be generated between the second command C2 and the third command C3 by the barrier command CMD_B.

The first command C1 may be or include a command for reading data. The second command C2 may be or include a command for writing the read data. The third command C3 may be or include a command for discarding the read data. In response to the barrier BAR, the UFS device 1200 may not process the third command C3 until the first command C1 and the second command C2 all are processed. Accordingly, even though SPO occurs at any time, the loss of data may be reduced or prevented.

Figure 23:
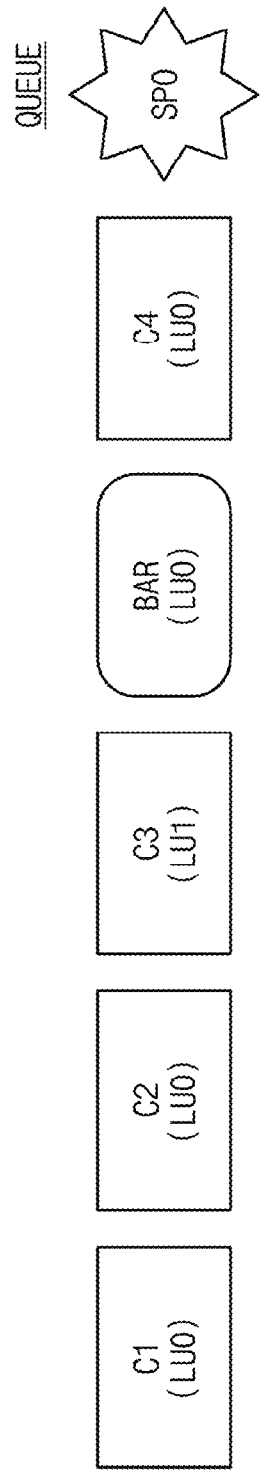
FIG. 23 illustrates an example in which data are restored when SPO occurs.

FIG. 23 illustrates an example in which data are restored when SPO occurs. Referring to FIGS. 1 and 23, a first command C1, a second command C2, a third command C3, and a fourth command C4 that are sequentially received from the UFS host 1100 may be sequentially stored in the queue QUEUE of the UFS device 1200. A barrier BAR may be generated in response to the barrier command CMD_B received between the third command C3 and the fourth command C4.

For example, the first command C1 may be stored at a 0-th logical unit LU0, the second command C2 may be stored at the 0-th logical unit LU0, the third command C3 may be stored at a first logical unit LU1, and the fourth command C4 may be stored at the 0-th logical unit LU0. After the fourth command C4 is processed, SPO may occur.

In some example embodiments where a barrier scope BarrierScope is a device, after all processing results of the first command C1, the second command C2, and the third command C3 are restored, a processing result of the fourth command C4 may be restored. In example embodiments where a processing result of one of the first command C1, the second command C2, and the third command C3 is not restored, to restore the processing result of the fourth command C4 is not permitted.

In some example embodiments where the barrier scope BarrierScope is a logical unit, after all the processing results of the first command C1 and the second command C2 are restored, the processing result of the fourth command C4 may be restored. In some example embodiments where a processing result of one of the first command C1 and the second command C2 is not restored, to restore the processing result of the fourth command C4 is not permitted. Whether to restore the processing result of the third command C3 may not influence whether to restore the processing result of the fourth command C4.

Figure 24:
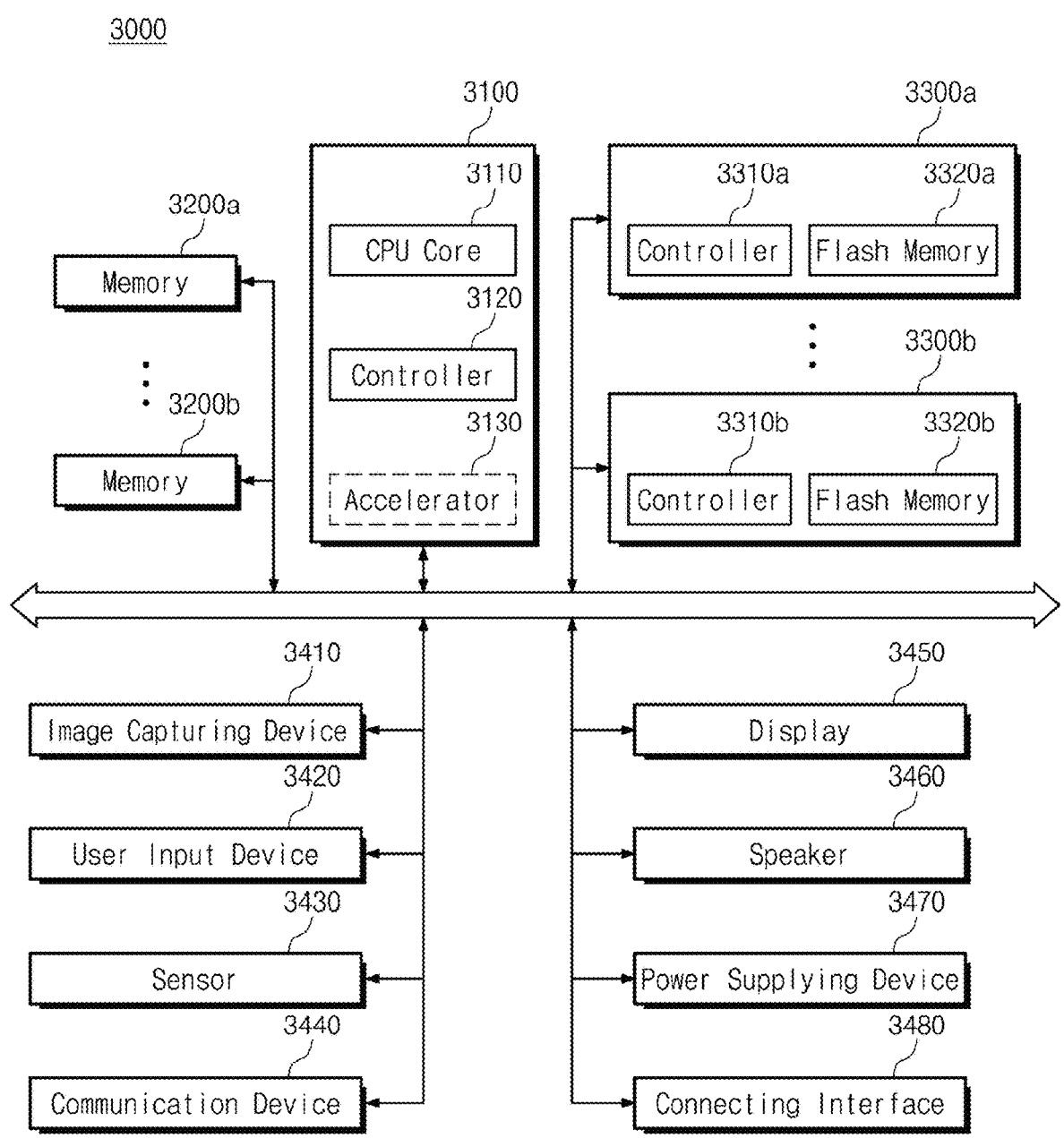
FIG. 24 is a diagram illustrating a system to which a storage device according to some example embodiments of inventive concepts is applied.

FIG. 24 is a diagram illustrating a system to which a storage device according to some example embodiments of inventive concepts is applied. A system 3000 of FIG. 24 may be a mobile system such as a mobile phone, a smartphone, a tablet personal computer (PC), a wearable device, a healthcare device, or an Internet of Things (IoT) device. However, the system 3000 of FIG. 24 is not limited to the mobile system. For example, the system 3000 may be a personal computer, a laptop computer, a server, an automotive device, such as a media player or a navigation system, or the like.

Referring to FIG. 24, the system 3000 may include a main processor 3100, memories 3200a and 3200b, and storage devices 3300a and 3300b. The system 3000 may further include one or more of an image capturing device 3410, a user input device 3420, a sensor 3430, a communication device 3440, a display 3450, a speaker 3460, a power supplying device 3470, and a connecting interface 3480.

The main processor 3100 may control overall operations of the system 3000, in detail, may control operations of the remaining components of the system 3000. The main processor 3100 may be implemented with a general-purpose processor, a dedicated processor, an application processor, or the like.

The main processor 3100 may include one or more CPU cores 3110 and may further include a controller 3120 for controlling the memories 3200a and 3200b and/or the storage devices 3300a and 3300b. According to example embodiments, the main processor 3100 may further include an accelerator block 3130 being a dedicated circuit for high-speed data calculation such as artificial intelligence (AI) data calculation. The accelerator block 3130 may include a graphics processing unit (GPU), a neural processing unit (NPU), and/or a data processing unit (DPU) and may be implemented with a separate chip physically independent of any other component of the main processor 3100.

The memories 3200a and 3200b may be used as a main memory device of the system 3000 and may include a volatile memory such as a static random access memory (SRAM) and/or a dynamic random access memory (DRAM). However, the memories 3200a and 3200b may include a nonvolatile memory such as at least one of a flash memory, a phase change RAM (PRAM), and/or a resistive RAM (RRAM). It is possible to implement the memories 3200a and 3200b within the same package together with the main processor 3100.

The storage devices 3300a and 3300b may function as a nonvolatile storage device storing data regardless of whether a power is supplied and may have a relatively large storage capacity compared to the memories 3200a and 3200b. The storage device 3300a may include a storage controller 3310a and non-volatile memory (NVM) storage 3320a storing data under control of the storage controller 3310a, and the storage device 3300b may include a storage controller 3310b and non-volatile memory (NVM) storage 3320b storing data under control of the storage controller 3310b. Each of the non-volatile memory storages 3320a and 3320b may include a flash memory of a two-dimensional (2D) structure or a V-NAND flash memory of a three-dimensional structure or may include a different kind of nonvolatile memory such as a PRAM or a RRAM.

The storage devices 3300a and 3300b may be included in the system 3000 in a state of being physically separated from the main processor 3100 or may be implemented within the same package together with the main processor 3100. Alternatively, the storage devices 3300a and 3300b may be implemented in the form of a solid state drive (SSD) or a memory card. In some example embodiments, the storage devices 3300a and 3300b may be removably connected with any other components of the system 3000 through an interface to be described later, such as the connecting interface 3480. The storage devices 3300a and 3300b may include, but are not limited to, a device to which the standard such as at least one of universal flash storage (UFS), embedded multi-media card (eMMC), or non-volatile memory express (NVMe) is applied.

The image capturing device 3410 may capture a still image or a moving image and may include a camera, a camcorder, and/or a webcam.

The user input device 3420 may receive various types of data input by a user of the system 3000 and may include a touch pad, a keypad, a keyboard, a mouse, and/or a microphone.

The sensor 3430 may detect various types of physical quantities capable of being obtained from the outside of the system 3000 and may convert the detected physical quantities to electrical signals. The sensor 3430 may include a temperature sensor, a pressure sensor, an illumination sensor, a position sensor, an acceleration sensor, a biosensor, and/or a gyroscope sensor.

The communication device 3440 may transmit and receive signals to and from external devices of the system 3000 in compliance with various communication protocols. The communication device 3440 may be implemented to include an antenna, a transceiver, and/or a MODEM.

The display 3450 and the speaker 3460 may function as output devices outputting visual information and auditory information to the user of the system 3000, respectively.

The power supplying device 3470 may appropriately convert a power supplied from a battery (not illustrated) embedded in the system 3000 and/or an external power source so as to be supplied to each component of the system 3000.

The connecting interface 3480 may provide a connection between the system 3000 and an external device capable of exchanging data with the system 3000 when connected with the system 3000. The connecting interface 3480 may be implemented with various interfaces such as at least one of an ATA (Advanced Technology Attachment) interface, an SATA (Serial ATA) interface, an e-SATA (external SATA) interface, an SCSI (Small Computer Small Interface) interface, an SAS (Serial Attached SCSI) interface, a PCI (Peripheral Component Interconnection) interface, a PCIe (PCI express) interface, an NVMe (NVM express) interface, an IEEE 1394 interface, an USB (Universal Serial Bus) interface, an SD (Secure Digital) card interface, an MMC (Multi-Media Card) interface, an eMMC (embedded Multi-Media Card) interface, an UFS (Universal Flash Storage) interface, an eUFS (embedded Universal Flash Storage) interface, and a CF (Compact Flash) card interface.

The above description associated with the system 3000 of FIG. 24 may be applied to the UFS system 1000 of FIG. 1 unless contradictory to the above description given with reference to FIG. 1.

In example embodiments where the main processor 3100 of FIG. 24 is an application processor, the UFS host 1100 may be implemented as a part of the application processor. The UFS host controller 1110 and the host memory 1140 may correspond to the controller 3120 of the main processor 3100 and the memories 3200a and 3200b of FIG. 24, respectively. The UFS device 1200 may correspond to the storage devices 3300a and 3300b of FIG. 24, and the UFS device controller 1210 and the nonvolatile memory 1220 may correspond to the storage controllers 3310a and 3310b and the nonvolatile memory storages 3320a and 3320b of FIG. 24, respectively.

In the above example embodiments, components according to inventive concepts are described by using the terms "first", "second", "third", and the like. However, the terms "first", "second", "third", and the like may be used to distinguish components from each other and do not limit inventive concepts. For example, the terms "first", "second", "third", and the like do not involve an order or a numerical meaning of any form.

In the above example embodiments, components according to example embodiments of inventive concepts are described by using blocks. The blocks may be implemented with various hardware devices, such as an integrated circuit, an application specific IC (ASCI), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit or circuits enrolled as intellectual property (IP).

According to inventive concepts, a storage device may selectively support an execution order, e.g. an order of operations, e.g. an order guarantee of commands, based on a barrier command. Accordingly, a storage device with improved integrity, improved reliability, and improved processing speed, an operating method of the storage device, and/or an operating method of a computing device including the storage device are provided.

Any of the elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While inventive concepts have been described with reference to example embodiments thereof, it will be apparent to those of ordinary skill in the art that various changes and modifications may be made thereto without departing from the spirit and scope of inventive concepts as set forth in the following claims.

What is claimed is:

1. A storage device comprising:
   a nonvolatile memory device; and
   a controller circuitry configured to control the nonvolatile memory device,
   wherein, in response to a first command, a barrier command received after the first command, and a second command received after the barrier command being received from an external host device by the storage device, the controller circuitry is configured to support an ordering between the first command and the second command such that the second command is performed after the barrier command, and
   each of the first command and the second command is selected from types of commands selected from among write type commands, unmap type commands, and format-type commands,
   wherein, in response to a request from the external host device, the controller circuitry is configured to provide the external host device with a device descriptor associated with the ordering, and wherein the device descriptor includes extended universal flash storage (UFS) features support, the extended UFS features support includes 0-th to thirty-first bits, and the fourteenth bit of the extended UFS features support includes information indicating whether to support the barrier command.

2. The storage device of claim 1, wherein the write type commands include at least one of a writeback command or a writethrough command.

3. The storage device of claim 1, wherein the unmap type commands include at least one of a discard command or an erase command.

4. The storage device of claim 1, wherein the controller circuitry is configured to store level information of the ordering and to apply the ordering differently to two or more different types of commands, the applying based on the level information.

5. The storage device of claim 4, wherein, in response to a request from the external host device, the controller circuitry is configured to store the level information as one of attributes.

6. The storage device of claim 5, wherein the request of the external host device includes a query request.

7. The storage device of claim 1, wherein the device descriptor includes a barrier version, and at least one of,
the barrier version includes 0-th to fifteenth bits of a binary-coded decimal format,
the eighth to fifteenth bits of the barrier version include major version information,
the fourth to seventh bits of the barrier version include minor version information, or
wherein the 0-th to third bits of the barrier version include a version suffix.

8. The storage device of claim 1, wherein the controller circuitry is configured to manage a storage space of the nonvolatile memory device as at least one logical circuitry, the device descriptor includes a barrier scope,
in response to the barrier scope having a first value and the first command and the second command being associated with a same logical circuitry of the at least one logical circuitry, the controller circuitry is configured to support the ordering between the first command and the second command, and
wherein, in response to the barrier scope having a second value, the controller circuitry is configured to support the ordering between the first command and the second command regardless of a logical circuitry associated with the first command and a logical circuitry associated with the second command.

9. The storage device of claim 1, wherein the device descriptor includes a first barrier level, and
in response to the first barrier level having a 0-th value, the controller circuitry is configured to support a 0-th barrier level,
in response to the first barrier level having a first value, the controller circuitry is configured to support the 0-th barrier level and the first barrier level,
in response to the first barrier level having a second value, the controller circuitry is configured to support the 0-th barrier level, the first barrier level, and a second barrier level, or
in response to the first barrier level having a third value, the controller circuitry is configured to support the 0-th barrier level, the first barrier level, the second barrier level, and a third barrier level.

10. The storage device of claim 1, wherein the request of the external host device corresponds to a query request including a descriptor identifier of "0", an index of "0", and a selector of "1".

11. The storage device of claim 1, wherein, in response to a third command being received from the external host device before the first command, the controller circuitry is configured to support an order change between the first command and the third command.

12. The storage device of claim 1, wherein, in response to a third command being received from the external host device after the second command, the controller circuitry is configured to support an order change between the second command and the third command.

13. The storage device of claim 1, wherein, in response to a third command being received from the external host device after the barrier command, the controller circuitry is configured to execute the third command prior to the first command and the second command, the third command having a priority higher than priorities of the first command and the second command.

14. The storage device of claim 1, wherein, in response to a third command having a flag attribute of a head-of-queue being received from the external host device after the barrier command, the controller circuitry first executes the third command.

15. An operating method of a storage device, the method comprising:
receiving at least one first command;
receiving a barrier command after the at least one first command;
receiving at least one second command after the barrier command;
supporting an ordering between the at least one first command and the at least one second command in response to the barrier command such that the at least one second command is performed after the barrier command; and
providing a device descriptor associated with the ordering in response to a received request,
wherein each of the at least one first command and the at least one second command is selected from among write type commands, unmap type commands, and format-type commands, and
wherein the device descriptor includes extended universal flash storage (UFS) features support, the extended UFS features support includes 0-th to thirty-first bits, and the fourteenth bit of the extended UFS features support includes information indicating whether to support the barrier command.

16. The method of claim 15, further comprising:
setting a configuration descriptor and attributes, the configuration descriptor and attributes to configure the storage device,
wherein the configuration descriptor includes a first descriptor,
the write type commands cause writeback in response to a force access being a first value and cause writethrough in response to the force access being a second value,
wherein the unmap type commands cause erase in response to a provisioning type parameter of the first descriptor being a first value and cause discard in response to the provisioning type parameter being a second value, and
wherein the supporting of the ordering includes, selectively supporting the ordering in response to the force access, the provisioning type parameter, and a barrier level included in the attributes.

17. A Universal Flash Storage (UFS) device comprising:
a nonvolatile memory device; and
a controller circuitry configured to control the nonvolatile memory device,
wherein, in response to a first command, a barrier command received after the first command, and a second command received after the barrier command being received from a host device, the controller circuitry is configured to support an ordering between the first command and the second command such that the second command is performed after the barrier command, and
each of the first command and the second command is selected from among write type commands, unmap type commands, and format-type commands,
wherein, in response to a request from the host device, the controller circuitry is configured to provide the host device with a device descriptor associated with the ordering, and
wherein the device descriptor includes extended universal flash storage (UFS) features support, the extended UFS features support includes 0-th to thirty-first bits, and the fourteenth bit of the extended UFS features support includes information indicating whether to support the barrier command.

18. The UFS device of claim 17, wherein the first command and the second command have a simple task attribute.

19. The UFS device of claim 17, wherein the UFS device is configured to execute the second command before executing the first command when the first command has a simple task attribute and the second command has a head-of-queue (HoQ) attribute.

20. The UFS device of claim 17, wherein the controller circuitry is further configured not to ensure the ordering between the first command and the second command when the first command and the second command have a simple task attribute and high priority.

* * * * *